(12) United States Patent
Kuenzler et al.

(10) Patent No.: US 9,841,175 B2
(45) Date of Patent: Dec. 12, 2017

(54) OPTICS SYSTEM FOR SOLID STATE LIGHTING APPARATUS

(71) Applicant: GE LIGHTING SOLUTIONS, LLC, East Cleveland, OH (US)

(72) Inventors: Glenn Howard Kuenzler, Beachwood, OH (US); Jeremias Anthony Martins, Twinsburgh, OH (US); Jeyachandrabose Chinniah, Pontiac, MI (US); Dengke Cai, Mayfield Heights, OH (US); Mark J. Mayer, Sagamore Hills, OH (US); Benjamin Lee Yoder, Cleveland Heights, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 194 days.

(21) Appl. No.: 14/398,887

(22) PCT Filed: May 3, 2013

(86) PCT No.: PCT/US2013/039464
§ 371 (c)(1),
(2) Date: Nov. 4, 2014

(87) PCT Pub. No.: WO2013/166384
PCT Pub. Date: Nov. 7, 2013

(65) Prior Publication Data
US 2015/0131294 A1 May 14, 2015

Related U.S. Application Data

(63) Continuation-in-part of application No. 13/706,798, filed on Dec. 6, 2012.
(Continued)

(51) Int. Cl.
*F21V 29/60* (2015.01)
*F21V 29/74* (2015.01)
(Continued)

(52) U.S. Cl.
CPC ............... *F21V 29/60* (2015.01); *F21K 9/23* (2016.08); *F21K 9/232* (2016.08); *F21K 9/60* (2016.08);
(Continued)

(58) Field of Classification Search
CPC ............... F21V 29/60; F21K 9/62; F21K 9/60
See application file for complete search history.

(56) References Cited

U.S. PATENT DOCUMENTS 1,500,912 A 7/1924 Williams
1,811,782 A 6/1931 Duncan, Jr.
(Continued)

FOREIGN PATENT DOCUMENTS

CA 2496937 A1 3/2004
CA 2515647 A1 9/2004
(Continued)

OTHER PUBLICATIONS

International Search Report and Written Opinion dated Jan. 8, 2013 which was issued in connection with PCT Patent Application No. PCT/US2013/039464 which was filed on May 3, 2013.
(Continued)

*Primary Examiner* — Robert May
*Assistant Examiner* — Leah S Macchiarolo
(74) *Attorney, Agent, or Firm* — Peter T. DiMauro; GE Global Patent Operation

(57) ABSTRACT

An optical element for transmission of light produced by a solid state emitter includes at least one diffuser element, and a reflector supported by the at least one diffuser element and paced-apart from the emitter, the reflector defining an annu-
(Continued)

lar lip having an aperture therein and an axis normal to a plane defined by the aperture. The reflector further includes a first frustoconical surface coupled with the annular lip and angling outwardly in a first direction at a first angle relative to the axis, a second frustoconical surface coupled to the first frustoconical surface and angled outwardly at a second angle in a second direction opposite to the first direction, and a third surface coupled with the second frustoconical surface and angling outwardly at a third angle.

21 Claims, 15 Drawing Sheets

Related U.S. Application Data

(60) Provisional application No. 61/643,056, filed on May 4, 2012.

(51) Int. Cl.

| | | |
|---|---|---|
| *F21V 29/507* | (2015.01) | |
| *F21V 7/04* | (2006.01) | |
| *F21V 5/02* | (2006.01) | |
| *F21V 7/00* | (2006.01) | |
| *F21V 13/02* | (2006.01) | |
| *F21V 29/63* | (2015.01) | |
| *F21V 29/75* | (2015.01) | |
| *F21V 29/83* | (2015.01) | |
| *G02B 27/09* | (2006.01) | |
| *F21V 29/67* | (2015.01) | |
| *F21V 29/70* | (2015.01) | |
| *F21K 9/23* | (2016.01) | |
| *F21K 9/232* | (2016.01) | |
| *F21K 9/60* | (2016.01) | |
| F21V 29/02 | (2006.01) | |
| F21V 3/02 | (2006.01) | |
| F21V 7/22 | (2006.01) | |
| F21V 23/00 | (2015.01) | |
| F21V 29/77 | (2015.01) | |
| F21Y 101/00 | (2016.01) | |
| F21Y 105/00 | (2016.01) | |
| F21Y 105/10 | (2016.01) | |
| F21Y 115/10 | (2016.01) | |
| F21Y 115/15 | (2016.01) | |
| F21Y 113/13 | (2016.01) | |
| F21K 9/238 | (2016.01) | |
| F21V 29/87 | (2015.01) | |

(52) U.S. Cl.
CPC ............. *F21V 5/02* (2013.01); *F21V 7/0091* (2013.01); *F21V 7/041* (2013.01); *F21V 7/048* (2013.01); *F21V 13/02* (2013.01); *F21V 29/507* (2015.01); *F21V 29/63* (2015.01); *F21V 29/67* (2015.01); *F21V 29/70* (2015.01); *F21V 29/74* (2015.01); *F21V 29/75* (2015.01); *F21V 29/83* (2015.01); *G02B 27/0972* (2013.01); *F21K 9/238* (2016.08); *F21V 3/02* (2013.01); *F21V 7/22* (2013.01); *F21V 23/006* (2013.01); *F21V 23/009* (2013.01); *F21V 29/02* (2013.01); *F21V 29/773* (2015.01); *F21V 29/87* (2015.01); *F21Y 2101/00* (2013.01); *F21Y 2105/00* (2013.01); *F21Y 2105/10* (2016.08); *F21Y 2113/13* (2016.08); *F21Y 2115/10* (2016.08); *F21Y 2115/15* (2016.08); *Y02B 20/30* (2013.01)

(56) References Cited

U.S. PATENT DOCUMENTS

| | | |
|---|---|---|
| 3,180,981 A | 4/1965 | Ulffers |
| 3,341,689 A | 9/1967 | Reichenbach |
| 4,042,522 A | 8/1977 | Falk |
| 4,107,238 A | 8/1978 | Roper et al. |
| 4,120,565 A | 10/1978 | Rabl et al. |
| 4,141,941 A | 2/1979 | Travnicek |
| 4,211,955 A | 7/1980 | Ray |
| 4,320,268 A | 3/1982 | Brown |
| 4,337,506 A | 6/1982 | Terada |
| 4,388,678 A | 6/1983 | Turner |
| 4,506,316 A | 3/1985 | Thiry et al. |
| 4,562,018 A | 12/1985 | Neefe |
| 4,727,289 A | 2/1988 | Uchida |
| 4,803,394 A | 2/1989 | Holten |
| 4,826,424 A | 5/1989 | Arai et al. |
| 4,918,497 A | 4/1990 | Edmond |
| 4,933,822 A | 6/1990 | Nakamats |
| 4,966,862 A | 10/1990 | Edmond |
| 4,972,308 A | 11/1990 | Chen |
| 4,988,911 A | 1/1991 | Miller |
| 4,992,704 A | 2/1991 | Stinson |
| 5,027,168 A | 6/1991 | Edmond |
| 5,087,949 A | 2/1992 | Haitz |
| 5,093,576 A | 3/1992 | Edmond et al. |
| 5,110,278 A | 5/1992 | Tait et al. |
| 5,134,550 A | 7/1992 | Young |
| 5,140,220 A | 8/1992 | Hasegawa |
| 5,143,660 A | 9/1992 | Hamilton et al. |
| 5,210,051 A | 5/1993 | Carter, Jr. |
| 5,217,600 A | 6/1993 | Le et al. |
| 5,277,840 A | 1/1994 | Osaka et al. |
| 5,338,944 A | 8/1994 | Edmond et al. |
| 5,374,668 A | 12/1994 | Kanemura et al. |
| 5,393,993 A | 2/1995 | Edmond et al. |
| 5,405,251 A | 4/1995 | Sipin |
| 5,416,342 A | 5/1995 | Edmond et al. |
| 5,416,683 A | 5/1995 | McCarthy |
| 5,477,430 A | 12/1995 | Larose |
| 5,523,589 A | 6/1996 | Edmond et al. |
| 5,526,455 A | 6/1996 | Akita et al. |
| 5,535,230 A | 7/1996 | Abe |
| 5,561,346 A | 10/1996 | Byrne |
| 5,575,550 A | 11/1996 | Appeldorn et al. |
| 5,581,683 A | 12/1996 | Bertignoll et al. |
| 5,604,135 A | 2/1997 | Edmond et al. |
| 5,632,551 A | 5/1997 | Roney et al. |
| 5,660,461 A | 8/1997 | Ignatius et al. |
| 5,667,297 A | 9/1997 | Maassen |
| 5,669,486 A | 9/1997 | Shima |
| 5,688,042 A | 11/1997 | Madadi et al. |
| 5,739,554 A | 4/1998 | Edmond et al. |
| 5,753,730 A | 5/1998 | Nagata et al. |
| 5,812,717 A | 9/1998 | Gilliland |
| 5,813,753 A | 9/1998 | Vriens et al. |
| 5,850,126 A | 12/1998 | Kanbar |
| 5,851,063 A | 12/1998 | Doughty et al. |
| 5,858,227 A | 1/1999 | Stone et al. |
| 5,882,553 A | 3/1999 | Prophet et al. |
| 5,899,557 A | 5/1999 | McDermott |
| 5,906,425 A | 5/1999 | Gordin et al. |
| 5,906,429 A | 5/1999 | Mori et al. |
| 5,912,477 A | 6/1999 | Negley |
| 5,931,570 A | 8/1999 | Yamuro |
| 5,956,106 A | 9/1999 | Petersen et al. |
| 5,959,316 A | 9/1999 | Lowery |
| 5,962,971 A | 10/1999 | Chen |
| 5,968,422 A | 10/1999 | Kennedy |
| 6,066,861 A | 5/2000 | Hoehn et al. |
| 6,069,440 A | 5/2000 | Shimizu et al. |
| 6,141,034 A | 10/2000 | McCutchen |
| 6,142,652 A | 11/2000 | Richardson |
| 6,155,699 A | 12/2000 | Miller et al. |
| 6,156,242 A | 12/2000 | Saito et al. |
| 6,177,688 B1 | 1/2001 | Linthicum et al. |
| 6,187,606 B1 | 2/2001 | Edmond et al. |

(56) References Cited

U.S. PATENT DOCUMENTS

| | | |
|---|---|---|
| 6,204,523 B1 | 3/2001 | Carey et al. |
| 6,218,785 B1 | 4/2001 | Incerti |
| 6,218,790 B1 | 4/2001 | Jansa et al. |
| 6,222,207 B1 | 4/2001 | Carter-Coman et al. |
| 6,227,679 B1 | 5/2001 | Zhang et al. |
| 6,227,683 B1 | 5/2001 | Tukia |
| 6,234,648 B1 | 5/2001 | Boerner et al. |
| 6,252,254 B1 | 6/2001 | Soules et al. |
| 6,270,236 B1 | 8/2001 | Brussog |
| 6,274,890 B1 | 8/2001 | Oshio et al. |
| 6,294,800 B1 | 9/2001 | Duggal et al. |
| 6,305,821 B1 | 10/2001 | Hsieh et al. |
| 6,329,676 B1 | 12/2001 | Takayama et al. |
| 6,335,548 B1 | 1/2002 | Roberts et al. |
| 6,340,824 B1 | 1/2002 | Komoto et al. |
| 6,345,903 B1 | 2/2002 | Koike et al. |
| 6,346,973 B1 | 2/2002 | Shibamoto et al. |
| 6,350,041 B1 | 2/2002 | Tarsa et al. |
| 6,351,069 B1 | 2/2002 | Lowery et al. |
| 6,373,188 B1 | 4/2002 | Johnson et al. |
| 6,383,417 B1 | 5/2002 | Paulson et al. |
| 6,391,231 B1 | 5/2002 | Paulson et al. |
| 6,404,112 B1 | 6/2002 | Frings et al. |
| 6,404,125 B1 | 6/2002 | Garbuzov et al. |
| 6,404,131 B1 | 6/2002 | Kawano et al. |
| 6,410,940 B1 | 6/2002 | Jiang et al. |
| 6,429,583 B1 | 8/2002 | Levinson et al. |
| 6,465,961 B1 | 10/2002 | Cao |
| 6,472,765 B1 | 10/2002 | Sano et al. |
| 6,495,961 B1 | 12/2002 | Heinrich et al. |
| 6,498,355 B1 | 12/2002 | Harrah et al. |
| 6,504,171 B1 | 1/2003 | Grillot et al. |
| 6,504,301 B1 | 1/2003 | Lowery |
| 6,517,213 B1 | 2/2003 | Fujita et al. |
| 6,521,915 B2 | 2/2003 | Odaki et al. |
| 6,522,065 B1 | 2/2003 | Srivastava et al. |
| 6,536,914 B2 | 3/2003 | Hoelen et al. |
| 6,538,371 B1 | 3/2003 | Duggal et al. |
| 6,541,800 B2 | 4/2003 | Barnett et al. |
| 6,547,416 B2 | 4/2003 | Pashley et al. |
| 6,573,653 B1 | 6/2003 | Ishinaga |
| 6,576,930 B2 | 6/2003 | Reeh et al. |
| 6,578,986 B2 | 6/2003 | Swaris et al. |
| 6,600,175 B1 | 7/2003 | Baretz et al. |
| 6,601,984 B2 | 8/2003 | Yamamoto et al. |
| 6,609,813 B1 | 8/2003 | Showers et al. |
| 6,610,563 B1 | 8/2003 | Waitl et al. |
| 6,614,103 B1 | 9/2003 | Durocher et al. |
| 6,621,211 B1 | 9/2003 | Srivastava et al. |
| 6,626,557 B1 | 9/2003 | Taylor |
| 6,634,770 B2 | 10/2003 | Cao |
| 6,635,987 B1 | 10/2003 | Wojnarowski et al. |
| 6,642,618 B2 | 11/2003 | Yagi et al. |
| 6,657,379 B2 | 12/2003 | Ellens et al. |
| 6,661,167 B2 | 12/2003 | Eliashevich et al. |
| 6,670,748 B2 | 12/2003 | Ellens et al. |
| 6,674,233 B2 | 1/2004 | Ellens et al. |
| 6,680,569 B2 | 1/2004 | Mueller-Mach et al. |
| 6,683,325 B2 | 1/2004 | Waitl et al. |
| 6,685,852 B2 | 2/2004 | Setlur et al. |
| 6,709,132 B2 | 3/2004 | Ishibashi |
| 6,717,353 B1 | 4/2004 | Mueller et al. |
| 6,719,446 B2 | 4/2004 | Cao |
| 6,720,584 B2 | 4/2004 | Hata et al. |
| 6,730,939 B2 | 5/2004 | Eisert et al. |
| 6,734,465 B1 | 5/2004 | Taskar et al. |
| 6,744,077 B2 | 6/2004 | Trottier et al. |
| 6,746,885 B2 | 6/2004 | Cao |
| 6,796,680 B1 | 9/2004 | Showers et al. |
| 6,809,347 B2 | 10/2004 | Tasch et al. |
| 6,812,503 B2 | 11/2004 | Lin et al. |
| 6,814,470 B2 | 11/2004 | Rizkin et al. |
| 6,817,783 B2 | 11/2004 | Lee et al. |
| 6,833,565 B2 | 12/2004 | Su et al. |
| 6,841,804 B1 | 1/2005 | Chen et al. |
| 6,841,933 B2 | 1/2005 | Yamanaka et al. |
| 6,844,903 B2 | 1/2005 | Mueller-Mach et al. |
| 6,871,981 B2 | 1/2005 | Alexanderson et al. |
| 6,864,513 B2 | 3/2005 | Lin et al. |
| 6,917,057 B2 | 7/2005 | Stokes et al. |
| D508,575 S | 8/2005 | Buschmann et al. |
| 6,936,855 B1 | 8/2005 | Harrah |
| 6,936,857 B2 | 8/2005 | Doxsee et al. |
| 6,960,878 B2 | 11/2005 | Sakano et al. |
| 7,005,679 B2 | 2/2006 | Tarsa et al. |
| 7,011,432 B2 | 3/2006 | Chen et al. |
| 7,029,935 B2 | 4/2006 | Negley et al. |
| 7,040,774 B2 | 5/2006 | Beeson et al. |
| 7,055,987 B2 | 6/2006 | Staufert |
| 7,079,367 B1 | 7/2006 | Liljestrand |
| 7,086,756 B2 | 8/2006 | Maxik |
| 7,094,367 B1 | 8/2006 | Harmon et al. |
| D528,227 S | 9/2006 | Chou et al. |
| 7,101,061 B2 | 9/2006 | Nagai et al. |
| D531,741 S | 11/2006 | Takahashi |
| 7,144,131 B2 | 12/2006 | Rains |
| 7,144,140 B2 | 12/2006 | Sun et al. |
| D534,665 S | 1/2007 | Egawa et al. |
| 7,161,311 B2 | 1/2007 | Mueller et al. |
| 7,161,313 B2 | 1/2007 | Piepgras et al. |
| D538,950 S | 3/2007 | Maxik |
| D538,951 S | 3/2007 | Maxik et al. |
| D538,953 S | 3/2007 | Mama |
| 7,196,459 B2 | 3/2007 | Morris |
| D541,440 S | 4/2007 | Feit |
| 7,204,615 B2 | 4/2007 | Arik et al. |
| 7,223,000 B2 | 5/2007 | Yamamura |
| 7,224,001 B2 | 5/2007 | Cao |
| 7,229,196 B2 | 6/2007 | Hulse |
| 7,246,919 B2 | 7/2007 | Porchia et al. |
| 7,252,409 B2 | 8/2007 | Kim |
| 7,258,464 B2 | 8/2007 | Morris et al. |
| 7,273,300 B2 | 9/2007 | Mrakovich |
| D553,267 S | 10/2007 | Yuen |
| 7,284,882 B2 | 10/2007 | Burkholder |
| 7,303,315 B2 | 12/2007 | Ouderkirk et al. |
| 7,304,694 B2 | 12/2007 | Negley et al. |
| D560,286 S | 1/2008 | Maxik et al. |
| 7,314,291 B2 | 1/2008 | Tain et al. |
| 7,352,339 B2 | 4/2008 | Morgan et al. |
| D570,504 S | 6/2008 | Maxik et al. |
| D570,505 S | 6/2008 | Maxik et al. |
| 7,396,146 B2 | 7/2008 | Wang |
| 7,413,325 B2 | 8/2008 | Chen |
| 7,434,964 B1 | 10/2008 | Zheng et al. |
| 7,453,195 B2 | 11/2008 | Radkov et al. |
| 7,479,516 B2 | 1/2009 | Chen et al. |
| 7,479,662 B2 | 1/2009 | Soules et al. |
| 7,494,246 B2 | 2/2009 | Harbers et al. |
| D590,523 S | 4/2009 | Takahashi |
| 7,547,124 B2 | 6/2009 | Chang et al. |
| 7,549,772 B2 | 6/2009 | Wanga |
| 7,553,037 B2 | 6/2009 | Sullivan |
| 7,569,425 B2 | 8/2009 | Huang et al. |
| 7,572,033 B2 | 8/2009 | Sun et al. |
| 7,581,856 B2 | 9/2009 | Kang et al. |
| 7,585,090 B2 | 9/2009 | Wu |
| 7,588,351 B2 | 9/2009 | Meyer |
| 7,600,882 B1 | 10/2009 | Morejon et al. |
| 7,614,759 B2 | 11/2009 | Negley |
| 7,637,639 B2 | 12/2009 | Epstein |
| D613,887 S | 4/2010 | Lee et al. |
| D615,220 S | 5/2010 | Crane et al. |
| 7,736,020 B2 | 6/2010 | Baroky et al. |
| 7,748,870 B2 | 7/2010 | Chang et al. |
| 7,758,223 B2 | 7/2010 | Osawa et al. |
| 7,760,499 B1 | 7/2010 | Darbin et al. |
| 7,768,189 B2 | 8/2010 | Radkov |
| 7,784,972 B2 | 8/2010 | Heffington et al. |
| 7,800,909 B2 | 9/2010 | Sun |
| 7,837,363 B2 | 11/2010 | Liu |
| D629,153 S | 12/2010 | Chen |
| 7,932,535 B2 | 4/2011 | Mahalingam et al. |
| 8,030,886 B2 | 10/2011 | Mahalingam et al. |

(56) References Cited

U.S. PATENT DOCUMENTS

| | | |
|---|---|---|
| 8,035,966 B2 | 10/2011 | Reichenbach et al. |
| 8,057,071 B2 | 11/2011 | He et al. |
| 8,057,075 B2 | 11/2011 | Horng et al. |
| D653,365 S | 1/2012 | Yuan et al. |
| 8,094,393 B2 | 1/2012 | Minano et al. |
| 8,115,395 B2 | 2/2012 | Horng et al. |
| 8,125,126 B2 | 2/2012 | Lin et al. |
| 8,136,576 B2 | 3/2012 | Grimm |
| 8,152,318 B2 | 4/2012 | Richardson |
| D658,788 S | 5/2012 | Dudik et al. |
| D660,991 S | 5/2012 | Allen et al. |
| 8,227,961 B2 | 7/2012 | Van De Ven |
| 8,227,968 B2 | 7/2012 | Kaandorp et al. |
| 8,246,202 B2 | 8/2012 | Mart et al. |
| 8,282,249 B2 | 10/2012 | Liang et al. |
| 8,299,691 B2 | 10/2012 | Grimm |
| 8,314,537 B2 | 11/2012 | Gielen et al. |
| 8,319,408 B1 | 11/2012 | Horng |
| 8,324,790 B1 | 12/2012 | Hu |
| 8,390,182 B2 | 3/2013 | Vyu |
| 8,414,160 B2 | 4/2013 | Sun et al. |
| 8,541,932 B2 | 9/2013 | Horng |
| 8,562,161 B2 | 10/2013 | Tong et al. |
| 8,602,607 B2 | 12/2013 | Arik et al. |
| 8,608,341 B2 | 12/2013 | Boomgaarden et al. |
| 8,608,347 B2 | 12/2013 | Chinniah et al. |
| 8,616,714 B2 | 12/2013 | Lee et al. |
| 8,882,284 B2 | 11/2014 | Tong et al. |
| 9,523,488 B2 | 12/2016 | Le et al. |
| 2001/0009510 A1 | 7/2001 | Lodhie |
| 2001/0045573 A1 | 11/2001 | Waitl et al. |
| 2002/0043926 A1 | 4/2002 | Takahashi et al. |
| 2002/0063520 A1 | 5/2002 | Yu et al. |
| 2002/0070643 A1 | 6/2002 | Yeh |
| 2002/0079837 A1 | 6/2002 | Okazaki |
| 2002/0080501 A1 | 6/2002 | Kawae et al. |
| 2002/0084745 A1 | 7/2002 | Wang et al. |
| 2002/0084748 A1 | 7/2002 | Ayala et al. |
| 2002/0093820 A1 | 7/2002 | Pederson |
| 2002/0117676 A1 | 8/2002 | Katoh |
| 2002/0123164 A1 | 9/2002 | Slater, Jr. et al. |
| 2002/0163006 A1 | 11/2002 | Yoganandan et al. |
| 2002/0172354 A1 | 11/2002 | Nishi |
| 2002/0196638 A1 | 12/2002 | Stephens et al. |
| 2003/0021117 A1 | 1/2003 | Chan |
| 2003/0039120 A1 | 2/2003 | Cao |
| 2003/0057829 A1 | 3/2003 | Ellens et al. |
| 2003/0067008 A1 | 4/2003 | Srivastava et al. |
| 2003/0067264 A1 | 4/2003 | Takekuma |
| 2003/0090910 A1 | 5/2003 | Chen |
| 2003/0117770 A1 | 6/2003 | Montgomery et al. |
| 2003/0141563 A1 | 7/2003 | Wang |
| 2003/0146690 A1 | 8/2003 | Ellens et al. |
| 2003/0198021 A1 | 10/2003 | Freedman |
| 2003/0210555 A1 | 11/2003 | Cicero et al. |
| 2003/0214616 A1 | 11/2003 | Komoto et al. |
| 2004/0000862 A1 | 1/2004 | Setlur et al. |
| 2004/0000867 A1 | 1/2004 | Chen |
| 2004/0012027 A1 | 1/2004 | Keller et al. |
| 2004/0052077 A1 | 3/2004 | Shih |
| 2004/0056256 A1 | 3/2004 | Bokor et al. |
| 2004/0066142 A1 | 4/2004 | Stimac et al. |
| 2004/0070001 A1 | 4/2004 | Lee et al. |
| 2004/0097635 A1 | 5/2004 | Fan et al. |
| 2004/0136193 A1 | 7/2004 | Wu Liu |
| 2004/0170864 A1 | 9/2004 | Liu |
| 2004/0174651 A1 | 9/2004 | Aisenbrey |
| 2004/0177947 A1 | 9/2004 | Krassowski et al. |
| 2004/0190304 A1 | 9/2004 | Sugimoto et al. |
| 2004/0207998 A1 | 10/2004 | Suehiro et al. |
| 2004/0227149 A1 | 11/2004 | Ibbetson et al. |
| 2004/0228131 A1 | 11/2004 | Minano et al. |
| 2004/0256630 A1 | 12/2004 | Cao |
| 2004/0257797 A1 | 12/2004 | Suehiro et al. |
| 2004/0264197 A1 | 12/2004 | Bewig et al. |
| 2005/0007772 A1 | 1/2005 | Yen |
| 2005/0029927 A1 | 2/2005 | Setlur et al. |
| 2005/0068776 A1 | 3/2005 | Ge |
| 2005/0073244 A1 | 4/2005 | Chou et al. |
| 2005/0093430 A1 | 5/2005 | Ibbetson et al. |
| 2005/0110384 A1 | 5/2005 | Peterson |
| 2005/0116336 A1 | 6/2005 | Chopra et al. |
| 2005/0116597 A1 | 6/2005 | Hsu |
| 2005/0127378 A1 | 6/2005 | Suehiro et al. |
| 2005/0127543 A1 | 6/2005 | Ricking et al. |
| 2005/0174769 A1 | 8/2005 | Yong et al. |
| 2005/0174780 A1 | 8/2005 | Park |
| 2005/0224829 A1 | 10/2005 | Negley et al. |
| 2005/0227388 A1 | 10/2005 | Setlur et al. |
| 2005/0253533 A1 | 11/2005 | Lys et al. |
| 2005/0265035 A1 | 12/2005 | Brass et al. |
| 2006/0005947 A1 | 1/2006 | Arik et al. |
| 2006/0012991 A1 | 1/2006 | Weaver, Jr. et al. |
| 2006/0034077 A1 | 2/2006 | Chang |
| 2006/0050514 A1 | 3/2006 | Opolka |
| 2006/0054915 A1 | 3/2006 | Chang |
| 2006/0066209 A1 | 3/2006 | Chau |
| 2006/0092640 A1 | 5/2006 | Li |
| 2006/0092641 A1 | 5/2006 | Phelan et al. |
| 2006/0098440 A1 | 5/2006 | Allen |
| 2006/0139744 A1 | 6/2006 | Mehrtens et al. |
| 2006/0187653 A1 | 8/2006 | Olsson |
| 2006/0193130 A1 | 8/2006 | Ishibash |
| 2006/0193132 A1 | 8/2006 | Kim et al. |
| 2006/0215422 A1 | 9/2006 | Laizure, Jr. |
| 2006/0232974 A1 | 10/2006 | Lee et al. |
| 2006/0255347 A1 | 11/2006 | Denbaars et al. |
| 2007/0030666 A1 | 2/2007 | Cohen |
| 2007/0132366 A1 | 6/2007 | Yabe et al. |
| 2007/0147046 A1 | 6/2007 | Arik et al. |
| 2007/0159091 A1 | 7/2007 | Hirosaki et al. |
| 2007/0159828 A1 | 7/2007 | Wang |
| 2007/0161135 A1 | 7/2007 | Keller et al. |
| 2007/0165411 A1 | 7/2007 | Abdelsamed |
| 2007/0189010 A1 | 8/2007 | Arai |
| 2007/0235751 A1 | 10/2007 | Radkov et al. |
| 2007/0236912 A1 | 10/2007 | Porch Ia et al. |
| 2007/0263405 A1 | 11/2007 | Ng et al. |
| 2007/0267976 A1 | 11/2007 | Bohler et al. |
| 2008/0007953 A1 | 1/2008 | Keller et al. |
| 2008/0009187 A1 | 1/2008 | Grimm et al. |
| 2008/0049445 A1 | 2/2008 | Harbers et al. |
| 2008/0062703 A1 | 3/2008 | Cao |
| 2008/0074871 A1 | 3/2008 | Meis et al. |
| 2008/0079017 A1 | 4/2008 | Loh et al. |
| 2008/0080166 A1 | 4/2008 | Duong et al. |
| 2008/0123349 A1 | 5/2008 | Chaves et al. |
| 2008/0130285 A1 | 6/2008 | Negley et al. |
| 2008/0192480 A1 | 8/2008 | Rizkin et al. |
| 2008/0198603 A1 | 8/2008 | Sormani et al. |
| 2008/0213578 A1 | 9/2008 | Endo et al. |
| 2008/0239202 A1 | 10/2008 | Won et al. |
| 2008/0266893 A1 | 10/2008 | Speier |
| 2008/0278955 A1 | 11/2008 | Boyer |
| 2008/0285270 A1 | 11/2008 | Chiang |
| 2008/0307646 A1 | 12/2008 | Zaderej et al. |
| 2008/0318049 A1 | 12/2008 | Hata et al. |
| 2009/0016062 A1 | 1/2009 | Lee et al. |
| 2009/0057699 A1 | 3/2009 | Basin et al. |
| 2009/0059591 A1 | 3/2009 | Nakamura et al. |
| 2009/0084866 A1 | 4/2009 | Grimm et al. |
| 2009/0086478 A1 | 4/2009 | Sanroma et al. |
| 2009/0103293 A1 | 4/2009 | Harbers et al. |
| 2009/0103296 A1 | 4/2009 | Harbers et al. |
| 2009/0109625 A1 | 4/2009 | Booth et al. |
| 2009/0129102 A1 | 5/2009 | Xiao et al. |
| 2009/0135595 A1 | 5/2009 | Chen |
| 2009/0148320 A1 | 6/2009 | Lucas |
| 2009/0167192 A1 | 7/2009 | Diederiks et al. |
| 2009/0174302 A1 | 7/2009 | Davey et al. |
| 2009/0195186 A1 | 8/2009 | Guest et al. |
| 2009/0225430 A1 | 9/2009 | Barnes et al. |
| 2009/0262545 A1 | 10/2009 | Amelung et al. |
| 2009/0267474 A1 | 10/2009 | Zhou et al. |

(56) References Cited

U.S. PATENT DOCUMENTS

| | | |
|---|---|---|
| 2009/0273925 A1 | 11/2009 | Schultz et al. |
| 2009/0279314 A1 | 11/2009 | Wu et al. |
| 2009/0295265 A1 | 12/2009 | Tabuchi et al. |
| 2009/0296387 A1 | 12/2009 | Reisenauer et al. |
| 2009/0302730 A1 | 12/2009 | Carroll et al. |
| 2009/0303735 A1 | 12/2009 | Chen |
| 2009/0310368 A1 | 12/2009 | Incerti et al. |
| 2010/0002432 A1 | 1/2010 | Romano |
| 2010/0018686 A1 | 1/2010 | Bontemps et al. |
| 2010/0053963 A1 | 3/2010 | Yang et al. |
| 2010/0072506 A1 | 3/2010 | Bae et al. |
| 2010/0103666 A1 | 4/2010 | Chang et al. |
| 2010/0118495 A1 | 5/2010 | Janssen et al. |
| 2010/0123397 A1 | 5/2010 | Tian et al. |
| 2010/0156325 A1 | 6/2010 | Nelson |
| 2010/0170657 A1 | 7/2010 | Kaslusky |
| 2010/0195335 A1 | 8/2010 | Allen et al. |
| 2010/0207502 A1 | 8/2010 | Cao et al. |
| 2010/0289396 A1 | 11/2010 | Osawa et al. |
| 2011/0018417 A1 | 1/2011 | Lai et al. |
| 2011/0037387 A1 | 2/2011 | Chou et al. |
| 2011/0063800 A1 | 3/2011 | Park |
| 2011/0080096 A1 | 4/2011 | Dudik et al. |
| 2011/0080740 A1 | 4/2011 | Allen et al. |
| 2011/0089804 A1 | 4/2011 | Mahalingam et al. |
| 2011/0089830 A1 | 4/2011 | Pickard et al. |
| 2011/0089838 A1 | 4/2011 | Pickard et al. |
| 2011/0095686 A1 | 4/2011 | Falicoff et al. |
| 2011/0121707 A1 | 5/2011 | Fan |
| 2011/0122582 A1 | 5/2011 | Park et al. |
| 2011/0128746 A1 | 6/2011 | Zheng |
| 2011/0140148 A1 | 6/2011 | Lui |
| 2011/0140149 A1 | 6/2011 | Lui et al. |
| 2011/0156584 A1 | 6/2011 | Kim |
| 2011/0162823 A1 | 7/2011 | Sharma et al. |
| 2011/0169394 A1 | 7/2011 | Chowdhury et al. |
| 2011/0170299 A1 | 7/2011 | Takase et al. |
| 2011/0204790 A1 | 8/2011 | Arik et al. |
| 2011/0212834 A1 | 9/2011 | Andersch et al. |
| 2011/0215345 A1 | 9/2011 | Tarsa et al. |
| 2011/0215698 A1 | 9/2011 | Tong et al. |
| 2011/0234078 A1 | 9/2011 | Choi et al. |
| 2011/0242816 A1 | 10/2011 | Chowdhury et al. |
| 2011/0279035 A1 | 11/2011 | Van Dijk et al. |
| 2011/0286200 A1* | 11/2011 | Iimura .................... F21V 7/041 362/84 |
| 2011/0298355 A1 | 12/2011 | Van De Ven |
| 2012/0002419 A1 | 1/2012 | Zaderej et al. |
| 2012/0008330 A1 | 1/2012 | Horng et al. |
| 2012/0026740 A1 | 2/2012 | Kim et al. |
| 2012/0051058 A1 | 3/2012 | Sharma et al. |
| 2012/0051088 A1 | 3/2012 | Chui et al. |
| 2012/0080669 A1 | 4/2012 | Yamazaki et al. |
| 2012/0080699 A1 | 4/2012 | Chowdhury et al. |
| 2012/0112615 A1 | 5/2012 | Kuenzler |
| 2012/0140486 A1 | 6/2012 | Chou |
| 2012/0155059 A1 | 6/2012 | Hoelen et al. |
| 2012/0161626 A1 | 6/2012 | Van De Ven et al. |
| 2012/0182711 A1 | 7/2012 | Kolodin et al. |
| 2012/0188771 A1 | 7/2012 | Kraus et al. |
| 2012/0188775 A1 | 7/2012 | Chuang |
| 2012/0194054 A1 | 8/2012 | Johnston et al. |
| 2012/0218768 A1 | 8/2012 | Hisano et al. |
| 2012/0243235 A1 | 9/2012 | Gao |
| 2012/0262915 A1 | 10/2012 | Lin et al. |
| 2012/0287652 A1 | 11/2012 | Breidenassel et al. |
| 2013/0038195 A1 | 2/2013 | Petroski et al. |
| 2013/0057140 A1 | 3/2013 | Falicoff et al. |
| 2013/0058098 A1 | 3/2013 | Kim et al. |
| 2013/0063962 A1 | 3/2013 | Huang et al. |
| 2013/0176721 A1 | 7/2013 | Lu et al. |
| 2013/0176722 A1 | 7/2013 | Lay et al. |
| 2013/0194796 A1 | 8/2013 | Progl |
| 2013/0201680 A1 | 8/2013 | Allen et al. |
| 2013/0214666 A1 | 8/2013 | Leung et al. |
| 2013/0214676 A1 | 8/2013 | Li et al. |
| 2013/0294086 A1 | 11/2013 | Mayer et al. |
| 2014/0218892 A1 | 8/2014 | Edwards et al. |
| 2014/0340899 A1 | 11/2014 | Bailey et al. |

FOREIGN PATENT DOCUMENTS

| | | |
|---|---|---|
| CA | 2549822 A1 | 5/2005 |
| CN | 2425428 Y | 3/2001 |
| CN | 1550870 A | 12/2004 |
| CN | 1551339 A | 12/2004 |
| CN | 1561528 A | 1/2005 |
| CN | 2800701 Y | 7/2006 |
| CN | 1811493 A | 8/2006 |
| CN | 1816504 A | 8/2006 |
| CN | 200955687 Y | 10/2007 |
| CN | 101104738 A | 1/2008 |
| CN | 101363610 A | 2/2009 |
| CN | 101517755 A | 8/2009 |
| CN | 201425284 Y | 3/2010 |
| CN | 101828071 A | 9/2010 |
| CN | 202065902 U | 12/2011 |
| DE | 10301169 A1 | 7/2003 |
| DE | 4208172 B4 | 5/2006 |
| DE | 102007037820 A1 | 2/2009 |
| DE | 202009001828 U1 | 7/2009 |
| DE | 202012101158 U1 | 4/2012 |
| EP | 0237104 A1 | 9/1987 |
| EP | 0415640 A2 | 3/1991 |
| EP | 0751339 A2 | 1/1997 |
| EP | 0859967 B1 | 8/1999 |
| EP | 1009017 A2 | 6/2000 |
| EP | 1191608 A2 | 3/2002 |
| EP | 1198016 A2 | 4/2002 |
| EP | 1253373 A2 | 10/2002 |
| EP | 1573870 A2 | 9/2005 |
| EP | 0942474 B1 | 4/2006 |
| EP | 1662197 A2 | 5/2006 |
| EP | 2177812 A1 | 4/2010 |
| EP | 2233832 A | 9/2010 |
| EP | 2236917 A1 | 10/2010 |
| EP | 2442009 A1 | 4/2012 |
| GB | 1423011 A | 1/1976 |
| GB | 2195047 A | 3/1988 |
| GB | 2366610 A | 3/2002 |
| GB | 2373846 A | 10/2002 |
| GB | 2405409 A | 3/2005 |
| GB | 2413896 A | 11/2005 |
| GB | 2424123 A | 9/2006 |
| JP | 6210456 U | 1/1987 |
| JP | 62199999 A | 9/1987 |
| JP | 6333879 A | 2/1988 |
| JP | 01233796 A | 9/1989 |
| JP | 04113466 U | 10/1992 |
| JP | 05152609 A | 6/1993 |
| JP | 06151974 A | 5/1994 |
| JP | 06177429 A | 6/1994 |
| JP | 06244458 A | 9/1994 |
| JP | 07193281 A | 7/1995 |
| JP | 08148724 A | 6/1996 |
| JP | 08162676 A | 6/1996 |
| JP | 08330635 A | 12/1996 |
| JP | 09246603 A | 9/1997 |
| JP | 10242513 A | 9/1998 |
| JP | 10282916 A | 10/1998 |
| JP | 11261114 A | 9/1999 |
| JP | 11298047 A | 10/1999 |
| JP | 2000101147 A | 4/2000 |
| JP | 2000101148 A | 4/2000 |
| JP | 2000123620 A | 4/2000 |
| JP | 2000156526 A | 6/2000 |
| JP | 2000164012 A | 6/2000 |
| JP | 2000174347 A | 6/2000 |
| JP | 2000183405 A | 6/2000 |
| JP | 2000208818 A | 7/2000 |
| JP | 2000286455 A | 10/2000 |
| JP | 2000286458 A | 10/2000 |
| JP | 2000304908 A | 11/2000 |
| JP | 2000315822 A | 11/2000 |

(56) References Cited

FOREIGN PATENT DOCUMENTS

| | | |
|---|---|---|
| JP | 2000315824 A | 11/2000 |
| JP | 2001035239 A | 2/2001 |
| JP | 2001057445 A | 2/2001 |
| JP | 2001077427 A | 3/2001 |
| JP | 2001077433 A | 3/2001 |
| JP | 2001108773 A | 4/2001 |
| JP | 2001111115 A | 4/2001 |
| JP | 2001144334 A | 5/2001 |
| JP | 2001173239 A | 6/2001 |
| JP | 2001215899 A | 8/2001 |
| JP | 2001218378 A | 8/2001 |
| JP | 2001230453 A | 8/2001 |
| JP | 2001237462 A | 8/2001 |
| JP | 2001243807 A | 9/2001 |
| JP | 2001243809 A | 9/2001 |
| JP | 2001274463 A | 10/2001 |
| JP | 2002118293 A | 4/2002 |
| JP | 2002133925 A | 5/2002 |
| JP | 2002133938 A | 5/2002 |
| JP | 2002141558 A | 5/2002 |
| JP | 2002150821 A | 5/2002 |
| JP | 2002158378 A | 5/2002 |
| JP | 2002223004 A | 8/2002 |
| JP | 2002261328 A | 9/2002 |
| JP | 2002280616 A | 9/2002 |
| JP | 2002304902 A | 10/2002 |
| JP | 2003017755 A | 1/2003 |
| JP | 2003023183 A | 1/2003 |
| JP | 2003037298 A | 2/2003 |
| JP | 2003110146 A | 4/2003 |
| JP | 2003110150 A | 4/2003 |
| JP | 2003110151 A | 4/2003 |
| JP | 2003124525 A | 4/2003 |
| JP | 2003206481 A | 7/2003 |
| JP | 2003206482 A | 7/2003 |
| JP | 2003224304 A | 8/2003 |
| JP | 2003249613 A | 9/2003 |
| JP | 2003346526 A | 12/2003 |
| JP | 2004161996 A | 6/2004 |
| JP | 2004185997 A | 7/2004 |
| JP | 2004186109 A | 7/2004 |
| JP | 2004188286 A | 7/2004 |
| JP | 2004207690 A | 7/2004 |
| JP | 2005108700 A | 4/2005 |
| JP | 2005513815 A | 5/2005 |
| JP | 2005166578 A | 6/2005 |
| JP | 2005228855 A | 8/2005 |
| JP | 2006502551 A | 1/2006 |
| JP | 2006310057 A | 11/2006 |
| JP | 2007234462 A | 9/2007 |
| JP | 2008021505 A | 1/2008 |
| JP | 2008200613 A | 9/2008 |
| JP | 2008211060 A | 9/2008 |
| JP | 2008544489 A | 12/2008 |
| JP | 2009016415 A | 1/2009 |
| JP | 2009032466 A | 2/2009 |
| JP | 2009037995 A | 2/2009 |
| JP | 2009038039 A | 2/2009 |
| JP | 2009070732 A | 4/2009 |
| JP | 2009099533 A | 5/2009 |
| JP | 2009170114 A | 7/2009 |
| JP | 2009181838 A | 8/2009 |
| JP | 2010033959 A | 2/2010 |
| JP | 2010504645 A | 2/2010 |
| JP | 2010506366 A | 2/2010 |
| JP | 2010056059 A | 3/2010 |
| JP | 2010073438 A | 4/2010 |
| JP | 2010518593 A | 5/2010 |
| JP | 2011061157 A | 3/2011 |
| JP | 2013524441 A | 6/2013 |
| KR | 100405453 B1 | 11/2003 |
| KR | 100934440 B1 | 12/2009 |
| KR | 20100009909 A | 1/2010 |
| KR | 20110008822 A | 1/2011 |
| KR | 101017349 B1 | 2/2011 |
| KR | 20110117090 A | 10/2011 |
| TW | 457731 B | 10/2001 |
| TW | 200516100 A | 5/2005 |
| WO | 9910867 A1 | 3/1999 |
| WO | 0057490 A1 | 9/2000 |
| WO | 02089175 A1 | 11/2002 |
| WO | 02091489 A2 | 11/2002 |
| WO | 03021623 A1 | 3/2003 |
| WO | 03040026 A2 | 5/2003 |
| WO | 2005028549 A2 | 3/2005 |
| WO | 2005057672 A2 | 6/2005 |
| WO | 2005089293 A2 | 9/2005 |
| WO | 2005102153 A1 | 11/2005 |
| WO | 2005103555 A1 | 11/2005 |
| WO | 2006003604 A1 | 1/2006 |
| WO | 2006011655 A1 | 2/2006 |
| WO | 2006067885 A1 | 6/2006 |
| WO | 2006117447 A1 | 11/2006 |
| WO | 2006129268 A2 | 12/2006 |
| WO | 2006135496 A2 | 12/2006 |
| WO | 2006138397 A2 | 12/2006 |
| WO | 2007130357 A2 | 11/2007 |
| WO | 2008085550 A2 | 7/2008 |
| WO | 2008120165 A1 | 10/2008 |
| WO | 2008134056 A1 | 11/2008 |
| WO | 2009052110 A2 | 4/2009 |
| WO | 2009068471 A1 | 6/2009 |
| WO | 2009071111 A1 | 6/2009 |
| WO | 2009089529 A1 | 7/2009 |
| WO | 20090084372 A1 | 7/2009 |
| WO | 20090115512 A1 | 9/2009 |
| WO | 2009128004 A1 | 10/2009 |
| WO | 2009135359 A1 | 11/2009 |
| WO | 2010038983 A2 | 4/2010 |
| WO | 2010146518 A1 | 12/2010 |
| WO | 2011089069 A2 | 7/2011 |
| WO | 2011089103 A1 | 7/2011 |
| WO | 2011159961 A1 | 12/2011 |
| WO | 2012084674 A1 | 6/2012 |

OTHER PUBLICATIONS

US Final Office Action issued in connection with related U.S. Appl. No. 13/706,798 dated Jun. 10, 2015.
European Search Report and Opinion issued in connection with related EP Application No. 13719685.3 dated Jan. 18, 2016.
Office Action issued in connection with related EP Application No. 13724956.1 dated Jan. 29, 2016.
Cree, "Cree® XLamp® XB-D LED 75-watt Equivalent A19 Lamp Reference Design", pp. 1-15, 2012.
Jiang et al., "TIR Optics Enhance the Illuminance on Target for Directional LED Modules", LEDs Magazine, http://ledsmagazine.com/features/9/2/8, Feb. 2012.
PCT Search Report and Written Opinion issued in connection with corresponding Application No. PCT/US2013/037556 dated Jul. 12, 2013.
PCT Search Report and Written Opinion issued in connection with corresponding Application No. PCT/US2013/039482 dated Jul. 25, 2013.
PCT Search Report and Written Opinion issued in connection with corresponding Application No. PCT/US2013/039513 dated Jul. 25, 2013.
PCT Search Report and Written Opinion issued in connection with corresponding Application No. PCT/US2013/067973 dated Feb. 4, 2014.
U.S. Non-Final Office Action issued in connection with related U.S. Appl. No. 14/398,944 dated Jul. 13, 2016.
European Office Action issued in connection with Related EP Application No. 13719685.3 dated Dec. 12, 2016.
Chinese Decision on Rejection issued on connection with Related CN Application No. 201180027205.3 dated Jan. 22, 2017.
Australian Office Action issued in connection with related AU Application No. 2015246150 dated Feb. 3, 2017.
U.S. Final Office Action issued in connection with related U.S. Appl. No. 13/886,878 dated Feb. 14, 2017.

(56) References Cited

OTHER PUBLICATIONS

U.S. Final Office Action issued in connection with related U.S. Appl. No. 14/398,944 dated Feb. 14, 2017.
Unofficial English Translation of Japanese Search Report issued in connection with related JP Application No. 2015212729 dated Feb. 27, 2017.
U.S. Appl. No. 14/398,944, filed Nov. 4, 2014, Glenn Howard Kuenzler et al.
U.S. Appl. No. 13/706,798, filed Dec. 6, 2012, Mark J. Mayer et al.
U.S. Appl. No. 13/665,959, filed Nov. 1, 2012, Glenn Howard Kuenzler et al.
U.S. Appl. No. 13/710,782, filed Dec. 11, 2012, Karl Kristian Udris et al.
U.S. Appl. No. 14/536,957, filed Nov. 10, 2014, Benjamin Lee Yoder et al.
U.S. Appl. No. 12/979,476, filed Dec. 28, 2010, Ashfaqul I. Chowdhury et al.
U.S. Appl. No. 12/979,573, filed Dec. 28, 2010, Ashfaqul I. Chowdhury et al.
U.S. Appl. No. 13/189,052, filed Jul. 22, 2011, Jeyachandrabose Chinniah et al.
U.S. Appl. No. 13/366,767, filed Feb. 6, 2012, Gary Robert Allen et al.
U.S. Appl. No. 12/979,611, filed Dec. 28, 2010, Ashfaqul Islam Chowdhury et al.
U.S. Appl. No. 14/205,542, filed Mar. 12, 2014, Gary R. Allen et al.
U.S. Appl. No. 12/979,529, filed Dec. 28, 2010, Ashfaqul I. Chowdhury et al.
U.S. Appl. No. 14/062,317, filed Oct. 24, 2013, David C. Dudik et al.
U.S. Appl. No. 12/896,314, filed Oct. 1, 2010, Gary R. Allen et al.
U.S. Appl. No. 13/886,878, filed May 3, 2013, Srinath K. Aanegola et al.
U.S. Appl. No. 11/516,533, filed Sep. 6, 2006, James Reginelli et al.
Japanese Before Appeal issued in connection with related JP Application No. 2007510852 dated Sep. 21, 2012.
PCT International Preliminary Report on Patentability issued in connection with Corresponding PCT Application No. PCT/US2011/028934 dated Oct. 2, 2012.
PCT International Preliminary Report on Patentability issued in connection with related PCT Application No. PCT/US2011/028970 dated Oct. 2, 2012.
PCT Search Report and Written Opinion issued in connection with related PCT Application No. PCT/US2012/046442 dated Oct. 10, 2012.
U.S. Final Office Action issued in connection with related U.S. Appl. No. 12/884,717 dated Nov. 6, 2012.
U.S. Notice of Allowance issued in connection with related U.S. Appl. No. 12/896,314 dated Dec. 7, 2012.
European Third Party Observation issued in connection with related EP Application No. 10821324.0 dated Dec. 17, 2012.
Final Office Action issued in connection with related U.S. Appl. No. 12/572,339 dated Jan. 11, 2013.
U.S. Non-Final Office Action issued in connection with related U.S. Appl. No. 12/572,480 dated Jan. 14, 2013.
U.S. Non-Final Office Action issued in connection with related U.S. Appl. No. 12/979,529 dated Feb. 7, 2013.
U.S. Non-Final Office Action issued in connection with related U.S. Appl. No. 13/189,052 dated Mar. 5, 2013.
PCT International Preliminary Report on Patentability issued in connection with related PCT Application No. PCT/US2011/028943 dated Apr. 2, 2013.
European Search Report and Opinion issued in connection with related EP Application No. 10821324.0 dated Apr. 8, 2013.
PCT Invitation to pay additional fees issued in connection with related PCT Application No. PCT/US2013/022485 dated May 6, 2013.
U.S. Notice of Allowance issued in connection with related U.S. Appl. No. 12/979,611 dated May 23, 2013.
U.S. Final Office Action issued in connection with related U.S. Appl. No. 12/979,476 dated Jun. 4, 2013.
Final Office Action issued in connection with related U.S. Appl. No. 12/979,529 dated Jun. 13, 2013.
PCT Search Report and Written Opinion issued in connection with related PCT Application No. PCT/US2013/022485 dated Jul. 4, 2013.
U.S. Non-Final Office Action issued in connection with related U.S. Appl. No. 12/572,339 dated Jul. 16, 2013.
U.S. Non-Final Office Action issued in connection with related U.S. Appl. No. 13/366,767 dated Jul. 19, 2013.
Chinese Office Action issued in connection with related CN Application No. 201080054757.9 dated Aug. 9, 2013.
Chinese Office Action issued in connection with related CN Application No. 201080054756.4 dated Aug. 21, 2013.
U.S. Notice of Allowance issued in connection with related U.S. Appl. No. 12/979,573 dated Oct. 29, 2013.
U.S. Non-Final Office Action issued in connection with related U.S. Appl. No. 12/979,476 dated Nov. 25, 2013.
U.S. Non-Final Office Action issued in connection with related U.S. Appl. No. 13/366,767 dated Jan. 15, 2014.
PCT International Preliminary Report on Patentability issued in connection with related PCT Application No. PCT/US2012/046442 dated Jan. 28, 2014.
European Search Report and Opinion issued in connection with related EP Application No. 05740241.4 dated Feb. 26, 2014.
U.S. Final Office Action issued in connection with related U.S. Appl. No. 12/572,339 dated Mar. 11, 2014.
Chinese Office Action issued in connection with related CN Application No. 201180057758.3 dated Apr. 3, 2014.
Chinese Office Action issued in connection with related CN Application No. 201080054757.9 dated Apr. 30, 2014.
Chinese Office Action issued in connection with related CN Application No. 201080054756.4 dated Jun. 10, 2014.
Chinese Office Action issued in connection with related CN Application No. 201180005962.0 dated Jun. 10, 2014.
European Office Action issued in connection with related EP Application No. 05740241.4 dated Jun. 16, 2014.
Chinese Office Action issued in connection with related CN Application No. 201180027211.9 dated Jun. 30, 2014.
U.S. Final Office Action issued in connection with related U.S. Appl. No. 13/366,767 dated Jul. 17, 2014.
Australian Examination Report issued in connection with related AU Application No. 2010300448 dated Jul. 19, 2014.
Australian Examination Report issued in connection with related AU Application No. 2010300489 dated Jul. 21, 2014.
U.S. Final Office Action issued in connection with related U.S. Appl. No. 12/979,476 dated Aug. 14, 2014.
Chinese Office Action issued in connection with corresponding CN Application No. 201180027205.3 dated Sep. 3, 2014.
Australian Examination Report issued in connection with related AU Application No. 2011233568 dated Oct. 22, 2014.
Australian Office Action issued in connection with related AU Application No. 2012287359 dated Oct. 23, 2014.
Australian Office Action issued in connection with related AU Application No. 2011233563 dated Oct. 27, 2014.
Japanese Office Action issued in connection with related JP Application No. 2012548995 dated Oct. 29, 2014.
Australian Examination Report issued in connection with related AU Application No. 2011205461 dated Nov. 3, 2014.
Japanese Office Action issued in connection with related JP Application No. 2013502622 dated Nov. 17, 2014.
Chinese Office Action issued in connection with related CN Application No. 201080054756.4 dated Nov. 26, 2014.
Chinese Office Action issued in connection with related CN Application No. 201180057758.3 dated Nov. 27, 2014.
Japanese Office Action issued in connection with corresponding JP Application No. 2013502627 dated Dec. 8, 2014.
Australian Examination Report issued in connection with related AU Application No. 2010300448 dated Dec. 12, 2014.
European Office Action issued in connection with related EP Application No. 11713110.2 dated Dec. 22, 2014.

(56) References Cited

OTHER PUBLICATIONS

Chinese Office Action issued in connection with related CN Application No. 201080054757.9 dated Jan. 6, 2015.
Australian Notice of Allowance issued in connection with related AU Application No. 2010300489 dated Jan. 7, 2015.
European Office Action issued in connection with related EP Application No. 11713109.4 dated Jan. 30, 2015.
Japanese Office Action issued in connection with related JP Application No. 2013531566 dated Feb. 2, 2015.
U.S. Non-Final Office Action issued in connection with related U.S. Appl. No. 13/366,767 dated Mar. 12, 2015.
U.S. Non-Final Office Action issued in connection with related U.S. Appl. No. 13/886,878 dated Mar. 16, 2015.
Chinese Office Action issued in connection with related CN Application No. 201180027211.9 dated Mar. 23, 2015.
U.S. Notice of Allowance issued in connection with related U.S. Appl. No. 12/572,339 dated Mar. 31, 2015.
Chinese Decision of Rejection issued in connection with related CN Application No. 201080054756.4 dated Apr. 17, 2015.
Chinese Office Action issued in connection with corresponding CN Application No. 201180027205.3 dated May 22, 2015.
U.S. Non-Final Office Action issued in connection with related U.S. Appl. No. 14/079,992 dated May 27, 2015.
Chinese Decision of Rejection issued in connection with related CN Application No. 201080054756.4 dated Jun. 3, 2015.
U.S. Final Office Action issued in connection with related U.S. Appl. No. 13/706,798 dated Jun. 10, 2015.
Australian Office Action issued in connection with related AU Application No. 2011233563 dated Jun. 12, 2015.
Australian Notice of Allowance issued in connection with related AU Application No. 2011205461 dated Jun. 25, 2015.
Japanese Office Action issued in connection with related JP Application No. 2012548995 dated Jun. 29, 2015.
Japanese Office Action issued in connection with corresponding JP Application No. 2013502627 dated Jul. 1, 2015.
Australian Examination Report issued in connection with related AU Application No. 2011233568 dated Jul. 10, 2015.
European Office Action issued in connection with related EP Application No. 11713110.2 dated Jul. 30, 2015.
U.S. Final Office Action issued in connection with related U.S. Appl. No. 13/366,767 dated Aug. 4, 2015.
Chinese Office Action issued in connection with related CN Application No. 201380008205.8 dated Aug. 6, 2015.
Japanese Office Action issued in connection with related JP Application No. 2013502622 dated Aug. 24, 2015.
Japanese Decision to Grant a Patent issued in connection with related JP Application No. 2013531566 dated Aug. 24, 2015.
Australian Notice of Allowance issued in connection with related AU Application No. 2011233563 dated Sep. 15, 2015.
U.S. Non-Final Office Action issued in connection with related U.S. Appl. No. 14/205,542 dated Sep 28, 2015.
U.S. Non-Final Office Action issued in connection with related U.S. Appl. No. 14/183,013 dated Oct. 5, 2015.
Australian Examination Report issued in connection with related AU Application No. 2011233568 dated Oct. 14, 2015.
U.S. Final Office Action issued in connection with related U.S. Appl. No. 13/886,878 dated Oct. 29, 2015.
Australian Notice of Allowance issued in connection with related AU Application No. 2011233568 dated Oct. 30, 2015.
Chinese Office Action issued in connection with related CN Application No. 201180057758.3 dated Nov. 12, 2015.
Chinese Office Action issued in connection with related CN Application No. 201180027205.3 dated Dec. 18, 2015.
Japanese Before Appeal issued in connection with related JP Application No. 2012548995 dated Feb. 2, 2016.
U.S. Notice of Allowance issued in connection with related U.S. Appl. No. 14/183,013 dated Feb. 12, 2016.
Chinese Notification of Reexamination issued in connection with related CN Application No. 201080054756.4 dated Mar. 3, 2016.
U.S. Non-Final Office Action issued in connection with related U.S. Appl. No. 14/062,169 dated Mar. 10, 2016.
Australian Examination Report issued in connection with related AU Application No. 2015203255 dated Apr. 1, 2016.
Japanese Office Action issued in connection with related JP Application No. 2013502622 dated May 11, 2016.
U.S. Non-Final Office Action issued in connection with related U.S. Appl. No. 13/886,878 dated May 17, 2016.
U.S. Non-Final Office Action issued in connection with related U.S. Appl. No. 14/205,542 dated May 17, 2016.
Chinese Office Action issued in connection with related CN Application No. 201180057758.3 dated May 30, 2016.
Japanese Office Action issued in connection with corresponding JP Application No. 2013502627 dated Jun. 6, 2016.
Australian Office Action issued in connection with related AU Application No. 2015246150 dated Jun. 14, 2016.
Chinese Office Action issued in connection with related CN Application No. 201180027205.3 dated Jul. 5, 2016.
U.S. Non-Final Office Action issued in connection with related U.S. Appl. No. 14/062,317 dated Aug. 30, 2016.
U.S. Non-Final Office Action issued in connection with related U.S. Appl. No. 14/062,169 dated Sep. 21, 2016.
Japanese Office Action issued in connection with related JP Application No. 2015212729 dated Oct. 17, 2016.
European Office Action issued in connection with related EP Application No. 11708124.0 dated Nov. 11, 2016.
U.S. Notice of Allowance issued in connection with related U.S. Appl. No. 14/205,542 dated Nov. 28, 2016.
European Office Action issued in connection with related EP Application No. 07837797.5 dated Dec. 6, 2016.
Australian Examination Report issued in connection with corresponding AU Application No. 2015246096 dated Dec. 23, 2016.
U.S. Non-Final Office Action issued in connection with Related U.S. Appl. No. 14/536,957 dated Oct. 19, 2016.
Berber et al., "Unusually High Thermal Conductivity of Carbon Nanotubes", Physical Review Letters, vol. No. 84, Issue No. 20, pp. 4613-4616, May 15, 2000.
Cookson Electronics, "Imaging Technologies Update", Enthone Inc, vol. No. 12, pp. 2, Jun. 2002.
Ohno, "Color Rendering and Lumious Efficacy of White LED Spectra", Proceedings, SPIE 5530, Fourth International Conference on Solid State Lighting, Denver, Aug. 3-5, 2004.
Radkov, "High Quality White Light with Near UV LED Chips", 3rd Annual Phophor Global Summit, SanDiego, Mar. 2, 2005.
D5470 "Standard Test Method for Thermal Transmission Properties . . . ,"ASTM International, pp. 1-6, 2006.
U.S. Non-Final Office Action issued in connection with related U.S. Appl. No. 10/831,862 dated Mar. 7 2006.
PCT Search Report and Written Opinion issued in connection with related PCT Application No. PCT/US2005/014043 dated Mar. 21, 2006.
U.S. Final Office Action issued in connection with related U.S. Appl. No. 10/831,862 dated Nov. 1, 2006.
PCT International Preliminary Report on Patentability issued in connection with related PCT Application No. PCT/US2005/014043 dated Nov. 1, 2006.
U.S. Non-Final Office Action issued in connection with related U.S. Appl. No. 11/312,268 dated Feb. 8, 2008.
PCT Search Report and Written Opinion issued in connection with related PCT Application No. PCT/US2006/047869 dated Jun. 20, 2008.
PCT International Preliminary Report on Patentability issued in connection with related PCT Application No. PCT/US2006/047869 dated Jun. 24, 2008.
U.S. Final Office Action issued in connection with related U.S. Appl. No. 11/312,268 dated Aug. 20, 2008.
Cao Group Inc., "Dynasty Light Redefined", Onesolutio, Sep. 25, 2008.
PCT Search Report and Written Opinion issued in connection with related PCT Application No. PCT/US2007/019425 dated Mar. 6, 2009.

(56) References Cited

OTHER PUBLICATIONS

PCT International Preliminary Report on Patentability issued in connection with related PCT Application No. PCT/US2007/019425 dated Mar. 10, 2009.
"Philips Lighting unveils 600 lumen dimmable A-shape LED bulb for incandescent replacement", LEDs Magazine, 2 pages, May 5, 2009 retrieved from http://www.ledsmagazine.com/products/18582?cmpid=EnlLEDsMay132009 on Feb. 13, 2017.
U.S. Non-Final Office Action issued in connection with related U.S. Appl. No. 11/516,533 dated May 15, 2009.
U.S. Department of Energy, "Energy Star Program Requirements for Integral LED Lamps", Draft2, at May 19, 2009.
"Sharp Introduces Nine New LED Lamps for Home Use", SHARP, Jun. 11, 2009, retrieved from http://sharp-world.com/corporate/news/090611_2.html on Feb. 13, 2017.
U.S. Department of Energy, "Bright Tomorrow Lighting Competition", Revision1, Jun. 26, 2009.
U.S. Final Office Action issued in connection with related U.S. Appl. No. 11/312,268 dated Aug. 24, 2009.
U.S. Department of Energy, "Energy Star Program Requirements for Integral LED Lamps, Eligibility Criteria", Draft3, Sep. 18, 2009.
Abdullah et al., "Enhancement of Natural Convection Heat Transfer From a Fin by Rectangular Perforations with Aspect Ratio of Two", International Journal of Physical Sciences, vol. No. 04, Issue No. 10, pp. 540-547, Oct. 2009.
U.S. Non-Final Office Action issued in connection with related U.S. Appl. No. 11/516,533 dated Nov. 24, 2009.
OSRAM, "OSRAM LEDs: give your home a bright new look", Dec. 16, 2009.
Australian Examination Report issued in connection with related AU Application No. 2005239406 dated Mar. 18, 2010.
PCT Search Report and Written Opinion issued in connection with related PCT Application No. PCT/US2010/051109 dated Dec. 1, 2010.
PCT Search Report and Written Opinion issued in connection with related PCT Application No. PCT/US2010/051043 dated Dec. 27, 2010.
Japanese Office Action issued in connection with related JP Application No. 2007510852 dated Feb. 7, 2011.
Australian Examination Report issued in connection with related AU Application No. 2005239406 dated May 3, 2011.
PCT Search Report and Written Opinion issued in connection with related PCT Application No. PCT/US2011/028970 dated Jun. 14, 2011.
Home Depot product catalog, "EcoSmart 13-Watt (60W) LED A19 Lamp Warm White Light Bulb", pp. 1-3, Jul. 13, 2011.
PCT Search Report and Written Opinion issued in connection with related PCT Application No. PCT/US2011/020744 dated Aug. 10, 2011.
PCT Search Report and Written Opinion issued in connection with related PCT Application No. PCT/US2011/028943 dated Aug. 25, 2011.
PCT Search Report and Written Opinion issued in connection with related PCT Application No. PCT/US2011/028934 dated Aug. 29, 2011.
Australian Examination Report issued in connection with related AU Application No. 2005239406 dated Aug. 31, 2011.
U.S. Restriction requirement issued in connection with related U.S. Appl. No. 29/359,239 dated Sep. 22, 2011.
Japanese Office Action issued in connection with related JP Application No. 2007510852 dated Dec. 12, 2011.
U.S. Non-Final Office Action issued in connection with related U.S. Appl. No. 12/572,480 dated Jan. 12, 2012.
PCT International Preliminary Report on Patentability issued in connection with related PCT Application No. PCT/US2010/051043 dated Apr. 3, 2012.
PCT International Preliminary Report on Patentability issued in connection with related PCT Application No. PCT/US2010/051109 dated Apr. 3, 2012.
U.S. Non-Final Office Action issued in connection with related U.S. Appl. No. 12/979,611 dated Apr. 10, 2012.
U.S. Non-Final Office Action issued in connection with related U.S. Appl. No. 12/572,339 dated Jun. 6, 2012.
U.S. Non-Final Office Action issued in connection with related U.S. Appl. No. 12/884,612 dated Jun. 12, 2012.
U.S. Non-Final Office Action issued in connection with related U.S. Appl. No. 12/884,717 dated Jun. 14, 2012.
PCT International Preliminary Report on Patentability issued in connection with related PCT Application No. PCT/US2011/020744 dated Jul. 26, 2012.
U.S. Final Office Action issued in connection with related U.S. Appl. No. 12/979,611 dated Sep. 12, 2012.
U.S. Notice of Allowance issued in connection with related U.S. Appl. No. 29/420,071 dated Sep. 14, 2012.
U.S. Non-Final Office Action issued in connection with related U.S. Appl. No. 12/979,476 dated Sep. 17, 2012.

* cited by examiner

OPTICS SYSTEM FOR SOLID STATE LIGHTING APPARATUS

CROSS-REFERENCE TO RELATED APPLICATIONS

This application claims priority to, and the benefit of, Provisional Patent Application Ser. No. 61/643,056 filed on May 4, 2012, the disclosure of which is incorporated herein by reference in its entirety.

This application also claims priority to, and the benefit of, Non-Provisional patent application Ser. No. 13/706,798, filed on Dec. 6, 2012, the disclosure of which is incorporated herein by reference in its entirety.

BACKGROUND

Field

The aspects of the present disclosure relate generally to lighting apparatus, and more particularly, to an optical system for a solid state lighting apparatus.

Description of Related Art

Electronic devices such as a lighting apparatus based on solid state light emitting sources typically require operation at relatively low temperatures for device performance and operational reliability. For example, the junction temperature for a typical light emitting diode ("LED") device should be below about one-hundred and fifty degrees Celsius (150° C.) or, more preferably, below about one-hundred degrees Celsius (100° C.). At these low operating temperatures, the radiant heat transfer is relatively low, hence conductive and convective heat transfer must be relied upon to properly dissipate heat for maintaining performance. To augment heat transfer, such LED light sources are typically equipped with a thermally-efficient heat sink.

A heat sink is a component providing a large surface area for radiating and convecting heat away from an electronic device. In a typical LED lamp, the heat sink is a relatively large metal component having a large surface area, for example, by the inclusion of thin fins or other heat dissipating structures along the exterior surface of the heat sink. The large mass of the heat sink efficiently conducts heat away from the LED device to the fins, and the large surface area of the fins provides efficient heat dissipation by radiation and convection. As the power requirements for LED lamps increase, the heat transfer requirements become more challenging. Thus, there is a continuous need to devise systems for efficient removal of heat from electronic devices such as high power LED lamps.

To augment heat dissipation, it is known to employ active cooling systems which incorporate fans, heat pipes, or fluid coolants, to provide a flow of cooling fluid or air across the heat sink of an LED lamp. In this way, heat is removed by convective heat transfer. While such active cooling systems are viable for electronic systems which are not space-constrained, difficulties arise when attempting to integrate such systems with a conventional household flood lamp/bulb employing a solid-state LED light source. That is, there are presently no satisfactory active cooling devices which integrate together with supporting subsystems, e.g., conduits, wiring harnesses, actuation mechanisms etc., of a conventional LED lamp.

There is also a need to improve optical efficiency of LED lamps. In this regard, to achieve a desired light intensity distribution, such as omnidirectional light, some existing LED lamps use a diffusing dome that encloses a light engine and a reflector. The reflector is spaced from the light engine and redirects some of the emitted light in one or more desired directions. While such reflectors provide the desired re-distribution of light, reflectors can have the adverse effect of absorbing light energy which increases the heat transfer requirements.

Alternatively, to achieve a desired intensity distribution, some existing lamps surround the emitter with a total internal reflection ("TIR") lens. Examples of such lenses are disclosed in US Patent Publications US2010/0123397 to Tian et al. and US2011/0170299 to Takase et al. However, such lenses surrounding the emitter are thick and expensive to mold. Further, they often have high light loss and occupy substantial volume in the diffusing dome.

Moreover, the total lumens of light exiting the diffusing dome of such LED lamps is always less than the total lumens of light emitted from the bare LED light engine. This loss of lumens is believed to be due to the absorption and/or diffusion of light by subsystems of the lamp.

Finally, it is difficult to achieve an aesthetically pleasing lamp profile, whether or not the lamp is illuminated or unpowered. In lamps of the prior art, the reflector or lens is frequently visible through the diffusing dome.

A need, therefore, exists for a LED lighting apparatus which distributes light uniformly while being optically efficient, economical, and aesthetically pleasing.

SUMMARY

As described herein, the exemplary embodiments overcome one or more of the above or other disadvantages known in the art.

One aspect of the present disclosure relates to an optical element for the transmission of light produced by a solid state emitter. In one embodiment, the optical element includes at least one diffuser element, and a reflector supported by the at least one diffuser element and spaced-apart from the emitter. The reflector defines an annular lip having an aperture therein and an axis normal to a plane defined by the aperture. The reflector further includes a first frustoconical surface coupled with the annular lip and angling outwardly in a first direction at a first angle relative to the axis, a second frustoconical surface coupled to the first frustoconical surface and angled outwardly at a second angle in a second direction opposite to the first direction, and a third surface coupled with the second frustoconical surface and angling outwardly at a third angle.

Another aspect of the present disclosure relates to a lighting apparatus. In one embodiment, the lighting apparatus includes an optical element, an emitter for producing a source of light for transmission by the optical element and a heat sink in thermal communication with the emitter. In one embodiment, the optical element includes a reflector spaced-apart from the emitter, the reflector defining an annular lip having an aperture therein and an axis normal to a plane of the aperture, a first frustoconical surface coupled with the annular lip and angling outwardly in a first direction at a first angle relative to the axis, a second frustoconical surface coupled to the first frustoconical surface and angled outwardly at a second angle in a second direction opposite to the first direction, and a third surface coupled with the second frustoconical surface and angling outwardly at a third angle.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DETAILED DESCRIPTION OF THE DISCLOSED EMBODIMENTS

Figure 1:
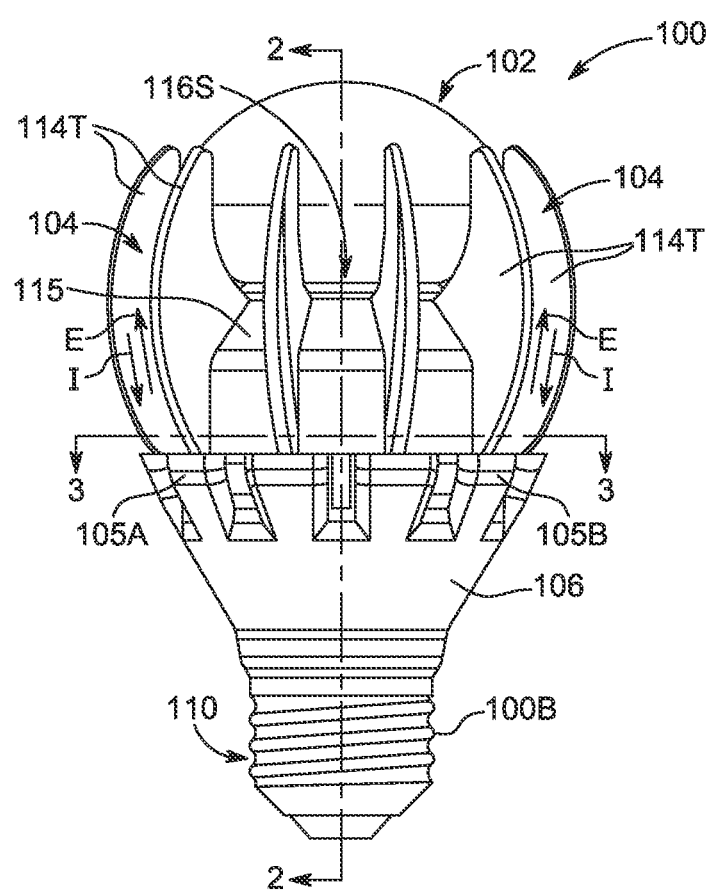
FIG. 1 is a perspective view of an exemplary electronically-operated device according to the teachings of the present disclosure.
Figure 2:
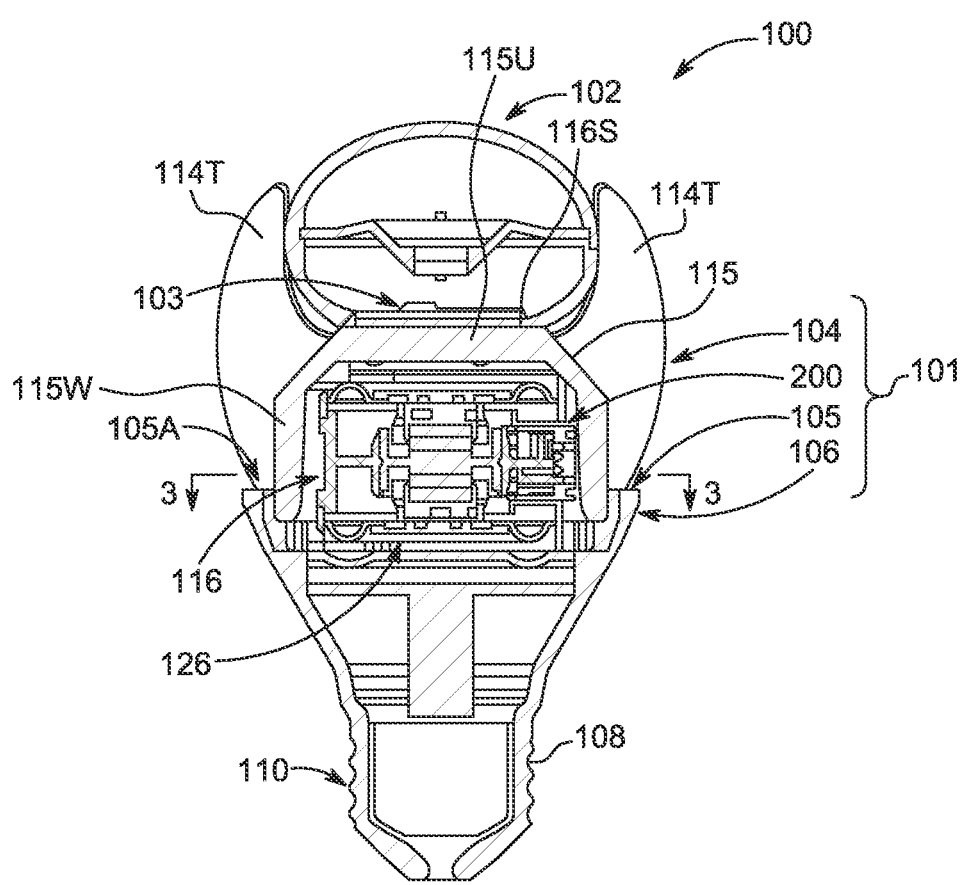
FIG. 2 is a cross-sectional view taken substantially along line 2-2 of FIG. 1 including the relevant internal details of an exemplary electronically-operated device according to one aspect of the present disclosure.

FIG. 1 provides a perspective view of an exemplary embodiment of an electronically-operated device according to an aspect of the present disclosure described in the context of an actively-cooled lamp 100. FIG. 2 is a sectional view of the lamp 100 taken substantially along line 2-2 of FIG. 1. In the embodiment shown in FIGS. 1 and 2, the lamp 100 includes an optical element 102 and a solid state emitter 103 (FIG. 2) for producing visible light. As used herein, the term "lamp" may be taken as being equivalent to any of the following alternative phraseology: "lighting device"; "lighting apparatus"; "light-emitting apparatus"; illumination device". As used herein, the term "optical element" may generally refer to a combination of diffuser(s), reflector(s), and any associated light management components (e.g., lenses).

While producing visible light, the solid state emitter 103 generates large quantities of heat which is dissipated by a thermal management system 101 (see FIG. 2). In the exemplary embodiment shown in FIG. 1, the thermal management system 101, whether for a lamp 100 or other electronically-operated device, includes a heat sink 104, a driver housing 106 defining a plurality of nozzles 105 configured to direct a flow of air across the heat sink 104, and an active cooler 200 for providing a propulsive force to ingest and expel air, along arrows I and E, respectively, through the nozzles 105. For the purposes of the description herein, the active cooler 200 will generally be referred to as a synthetic jet actuator (SJ). In one embodiment, and as will be discussed in greater detail below, the synthetic jet actuator 200 produces a flow of air with each movement, or stroke, of the synthetic jet actuator 200. As such, the synthetic jet actuator 200 provides a highly efficient propulsive system for moving air. Further, the propulsive air flow entrains a large quantity of air which further improves thermal efficiency.

Referring to FIGS. 1 and 2, in one embodiment, the synthetic jet actuator 200 is disposed within the assembly of the heat sink 104. For example, referring to FIG. 2, in one embodiment, the synthetic jet actuator 200 is disposed within a cavity 116 of the heat sink 104. In alternate embodiments, the synthetic jet actuator 200 can be disposed at any suitable location of the heat sink 104. For example, in one embodiment, an upper portion of the synthetic jet actuator 200 may be partially disposed within an upper portion of a cavity 116 (shown in FIG. 2) defined by the heat sink 104 while a lower portion of the synthetic jet actuator 200 may be partially disposed within a lower portion of the cavity 116, or a cavity defined by the driver housing 106. While, in the illustrated embodiment, the synthetic jet actuator 200 is disposed in a cavity 116 of the heat sink 104, it should be appreciated that the synthetic jet actuator 200 may be disposed within any structure of the lamp 100 or electronically operated device. Each element of the thermal management system 101 will now be discussed in greater detail in the context of a lamp that conforms to certain lamp design form factors. These criteria include, inter alia, conforming to an A19 volumetric profile, optical efficiency and distribution, the requirements of heat transfer, the cost of manufacture, appearance, etc. It should be appreciated, however, that the thermal management system 101 may take different forms depending upon the various design requirements. For example, in one embodiment, the synthetic jet actuator 200 may integrate differently depending upon the shape of the heat sink 104 and/or the arrangement of the nozzles 105.

Figure 3:
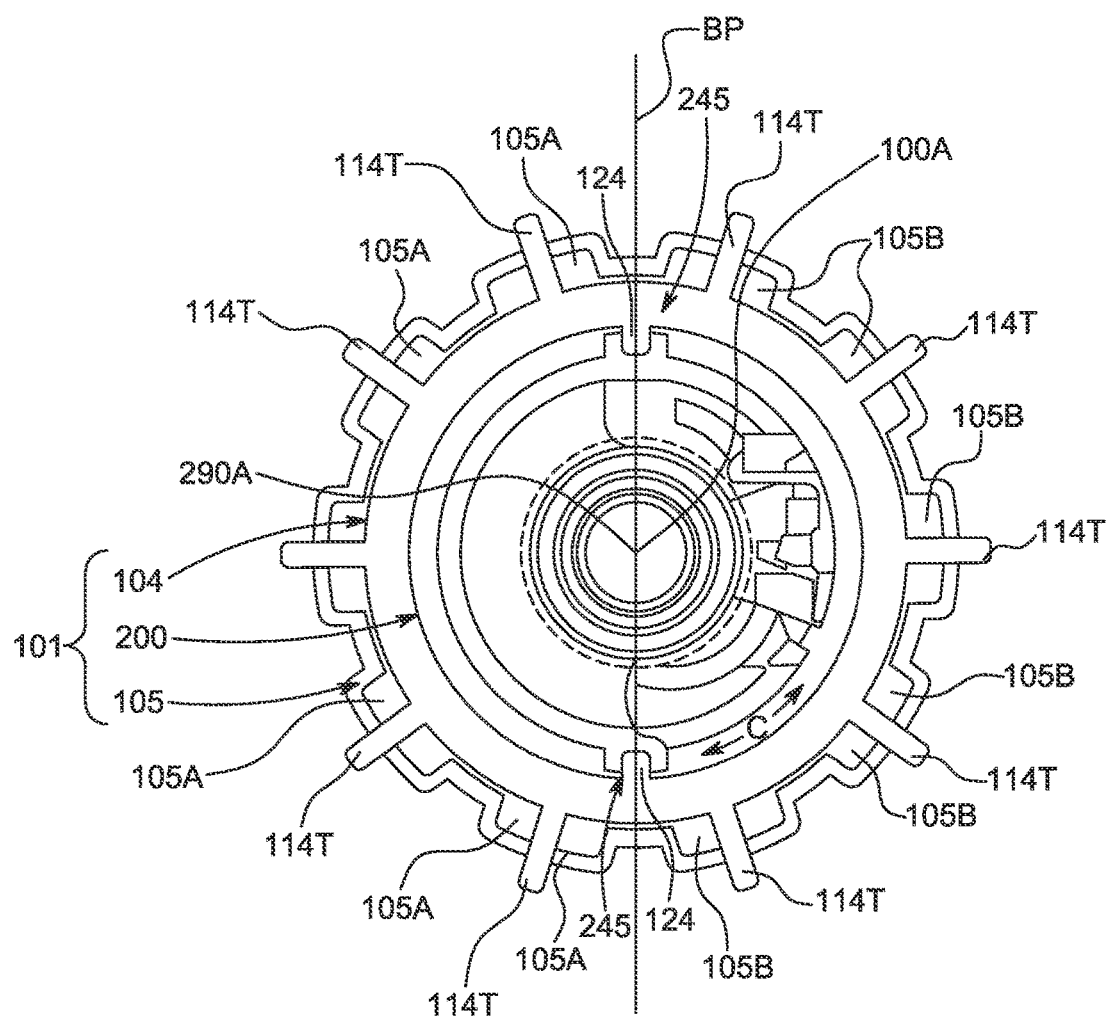
FIG. 3 is sectional view taken substantially along line 3-3 of FIG. 1 depicting one embodiment of a housing including a plurality of airflow nozzles, a heat sink, and a synthetic jet actuator.
Figure 4A:
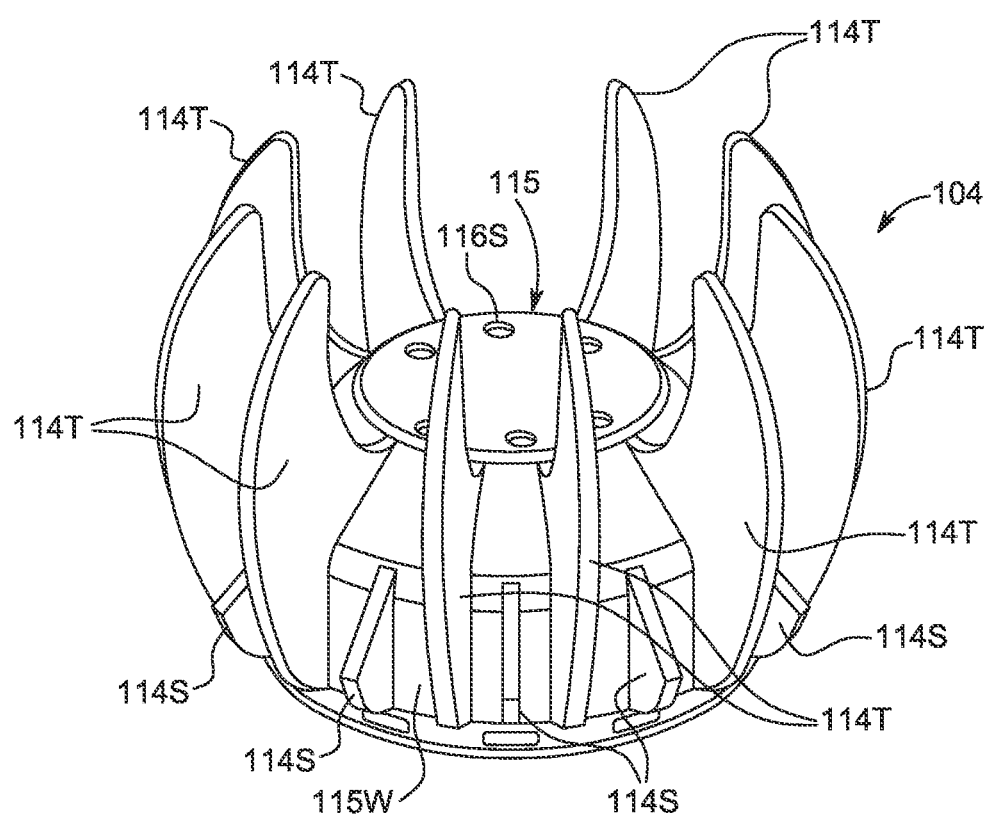
FIG. 4A is an isolated perspective view of one embodiment of a heat sink incorporating aspects of the present disclosure.
Figure 4B:
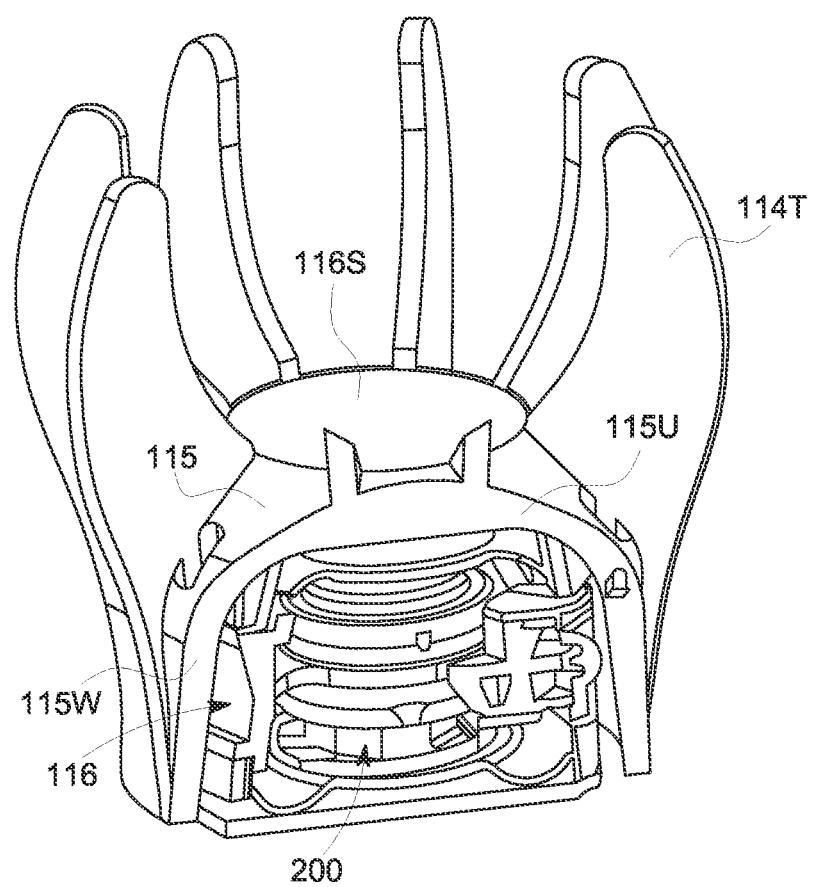
FIG. 4B is a cross-sectional view of one embodiment of a heat sink with a synthetic jet actuator, incorporating aspects of the present disclosure.
Figure 4C:
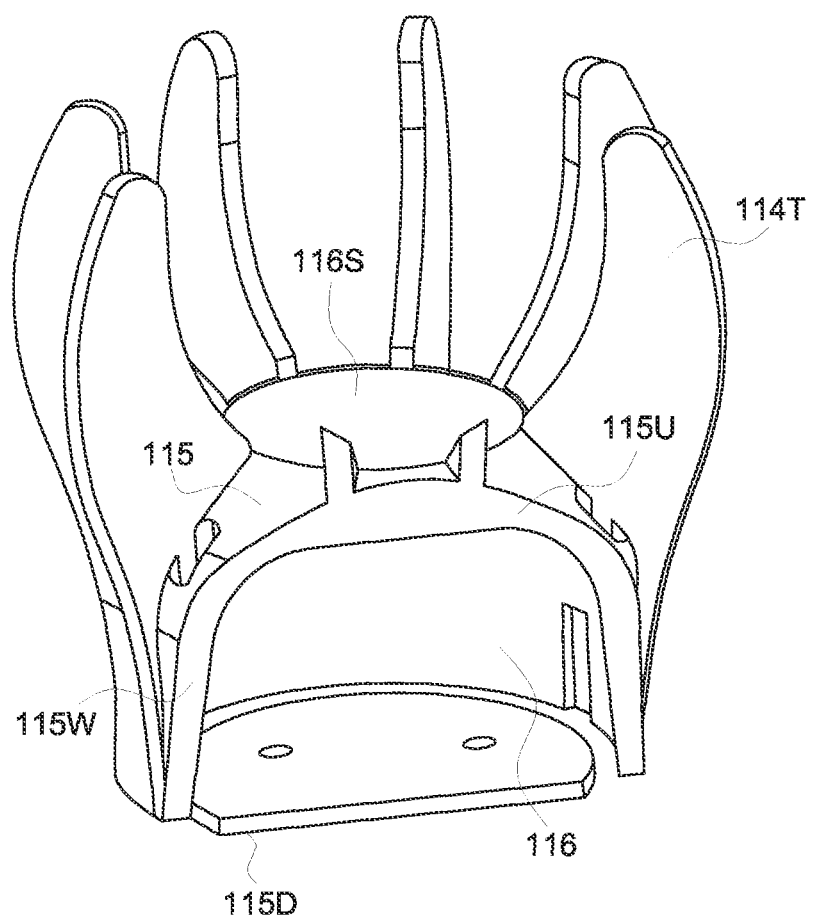
FIG. 4C is a cross-sectional view of one embodiment of a heat sink incorporating aspects of the present disclosure.

In the embodiments shown in FIGS. 2, 3 and 4, the heat sink 104 includes a main body 115 and a plurality of heat radiating, surface-area enhancing structures, such as fins 114T. As shown in FIG. 2, the fins 114T project vertically upward and radially outboard from the main body 115 and surround the optical element 102. In one embodiment, the thermal fins 114T are equiangular about a longitudinal axis 100A (FIG. 3), i.e., spaced-apart in a circumferential direction C. In the described embodiment, the heat sink 104 includes between eight (8) to ten (10) vertical fins 114T. In alternate embodiments, any suitable number of fins 114T may be employed. The isolated perspective view of the heat sink 104 shown in FIG. 4, depicts an alternate embodiment comprising alternating tall and small fins, 114T, 114S projecting from main body 115 of the heat sink 104. The small fins, or "finlets" 114S augment heat transfer without inhibiting the distribution of light from the optical element 102 (discussed in greater detail when describing the optical element in a second portion of the detailed description). The main body 115, which in one embodiment has a "cup-shaped" form, generally forms cavity 116 defined by a substantially cylindrical side wall 115W and an upper substantially horizontal wall 115U. FIG. 4B illustrates a cross-sectional view of the heat sink 104 illustrating a configuration that includes the synthetic jet actuator 200 substantially enclosed in cavity 116. FIG. 4C is similar to the view of FIG. 4B except that the synthetic jet actuator 200 is hidden, to illustrate the cavity 116. In one embodiment, a divider plate 115D separates and electrically insulates the synthetic jet actuator 200 from the driver housing 107.

In one embodiment, the cavity 116 is adapted to accept at least a portion of the synthetic jet actuator 200 and create an upper chamber UC1 (shown in FIGS. 6 and 7) for ingesting and expelling air. In the example shown, the upper wall 115U of the central area main body 115 also defines a mounting surface or shelf 116S between the tall and/or tall and short fins 114T, 114S. The mounting surface 116S accepts and supports the emitter 103 and/or the printed circuit (PC) board or electronics, also referred to as "light engine".

In various embodiments, the heat sink 104 and/or heat dissipating structures (e.g., fins 114T, 144S) may comprise one or more highly conductive materials. A highly conductive material facilitates the transfer of a thermal load (produced by the emitter 103) to the surrounding ambient air. Exemplary materials include, but are not limited to, metallic materials such as alloy steel, cast aluminum, extruded aluminum, copper, etc. Other materials may include engineered composite materials such as thermally-conductive polymers as well as plastics, plastic composites, ceramics, ceramic composites, nano-materials, such as carbon nanotubes (CNT) or CNT composites.

Other configurations may include a plastic body having a thermally conductive (e.g., copper) layer deposited or plated thereupon, such as disclosed in US Patent Publication 2011/0242816, hereby incorporated by reference. In order to maximize light output, the heat sink 104 and/or a tall or small fin/finlet 114T, 114S may comprise a reflective material or layer having reflectivity for visible light of greater than about 90%. Reflective heat sinks which may be employed are those described and enabled in US Patent Publication 2012/0080699, hereby incorporated by reference in its entirety.

In the embodiment shown in FIG. 1, the heat sink 104 is in thermal communication with the optical element 102 and the emitter 103 inasmuch as heat energy from each is transferred to the heat sink 104 during operation of the lamp 100. The phrase "thermal communication" generally refers to heat transfer that occurs between (or among) the two (or more) items capable of effecting molecular excitation regardless of how the heat is transferred between or among the items (e.g., conduction, convection, radiation, or a combinations thereof, directly or indirectly). In the described embodiment, a primary source of heat transfer from the emitter 103 to the heat sink 104 is by way of conduction. However, with the integration of a synthetic jet actuator 200, a majority of heat transferred from the heat sink 104 to the surrounding ambient air is by way of convection.

In the embodiment shown in FIGS. 1 and 2, the lamp 100 includes the driver housing 106. In one embodiment, the driver housing 106 defines or includes a plurality of air flow nozzles 105 which are in fluid communication with the synthetic jet actuator 200. By "fluid communication" is meant any air passageway or conduit which permits airflow between the synthetic jet actuator 200 and the nozzles 105. In the example of FIG. 1, the nozzles 105 direct a flow of cooling air along one or both sides, of each vertical fin 114T. Air may be ingested, along arrows I in FIGS. 1 and 2, by some of the nozzles 105A (see FIG. 3) while, at the same instant, air may be expelled, along arrows E in the same FIGS. 1 and 2, by other nozzles 105B. This will become clear hereinafter upon describing the operation of the synthetic jet actuator 200.

The driver housing 106 defines the passageways for directing air out one of the first and second plurality of nozzles 105A, 105B. In one embodiment, as shown in FIGS. 1 and 2, the driver housing 106 may form a cone-shaped housing defining an internal cavity 126 for accepting and supporting a lower portion of the synthetic jet actuator 200. The internal cavity 126 may also defines a lower chamber LC1 (seen in FIGS. 6 and 7) which cooperates with the upper chamber UC1 to cyclically ingest and expel air through the nozzles 105A, 105B. The import of the upper and lower chambers UC1, LC1 will become apparent when discussing the operation of the synthetic jet actuator 200 in greater detail below.

As is illustrated in the exemplary embodiments of FIGS. 1 and 2, the driver housing 106 is affixed to a base 100B which includes threads 110 for connection into, for example, a conventional electric socket. The threaded base 100B is merely exemplary and other embodiments for powering the emitter 103 and/or the synthetic jet 200 are contemplated.

The synthetic jet actuator 200 has a dimensional envelope which essentially conforms to the volumetric profile and form factor of an American National Standards Institute (ANSI) A19 lighting apparatus. Accordingly, in one embodiment, the general structure of the electronically-operated device/lamp 100 conforms in size and shape to the A19 volumetric profile.

Figure 5:
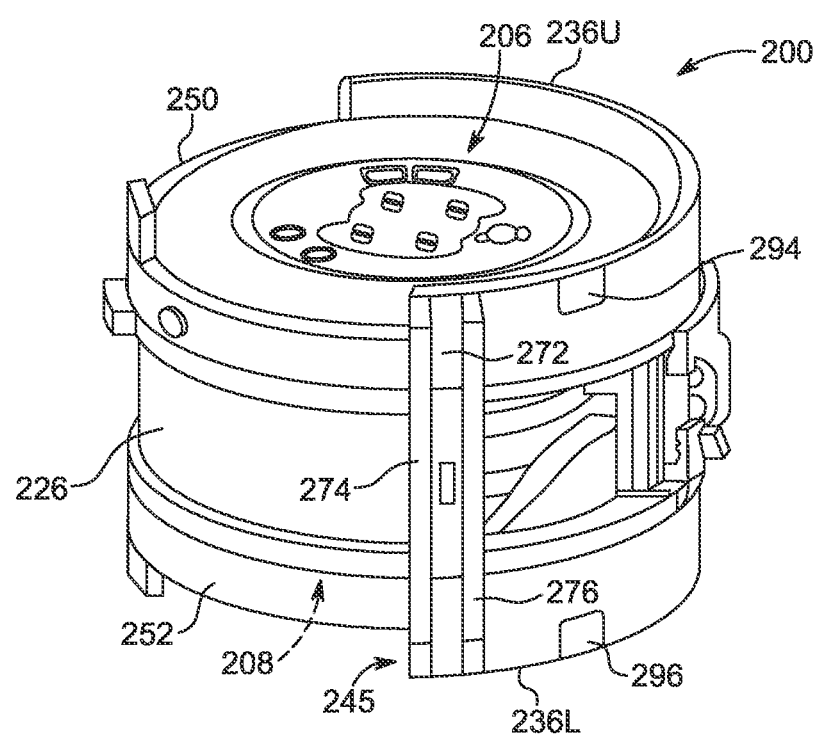
FIG. 5 is an isolated perspective view of one embodiment of a synthetic jet actuator incorporating aspects of the present disclosure.
Figure 6:
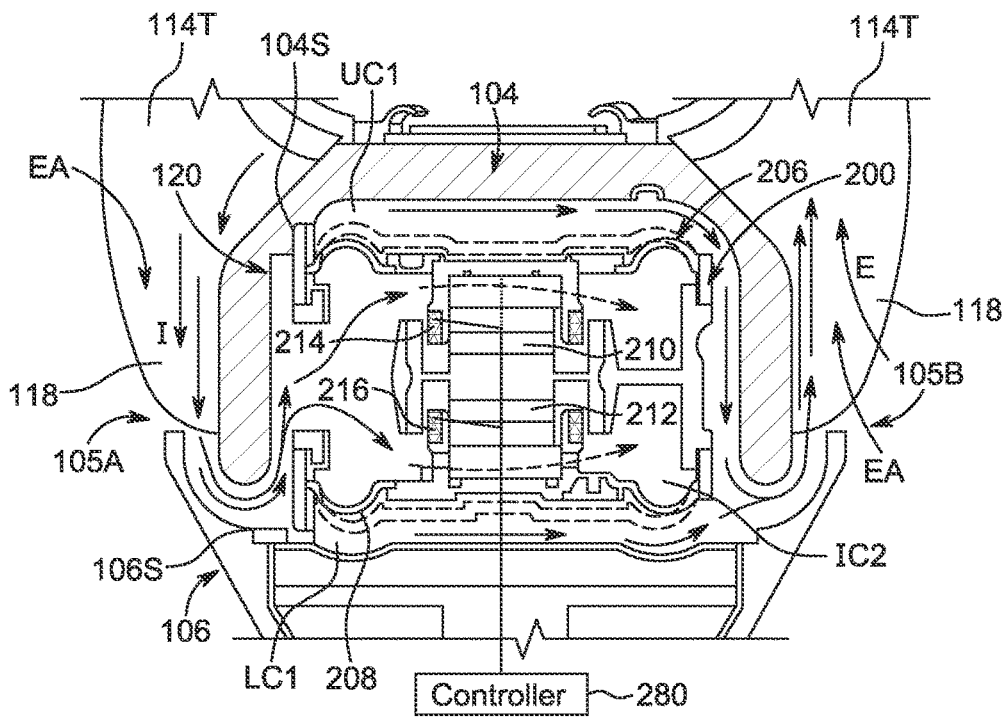
FIG. 6 is a broken-away schematic view of one embodiment of a synthetic jet actuator incorporating aspects of the present disclosure illustrating a first portion of an exemplary air movement cycle.
Figure 7:
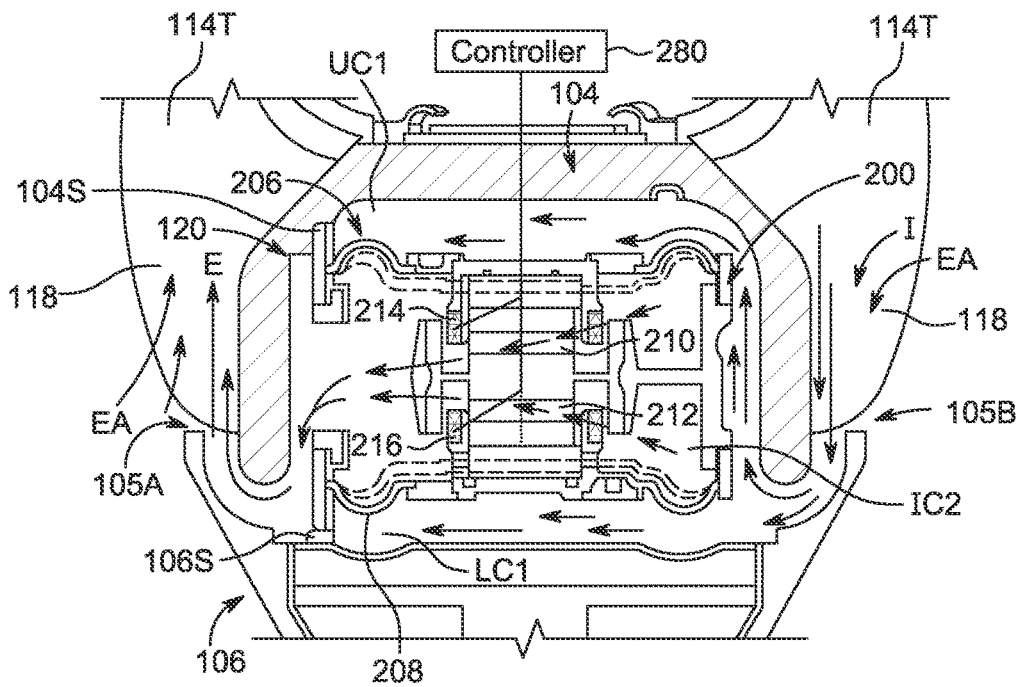
FIG. 7 is a broken-away schematic view of the example shown in FIG. 6 illustrating a second portion of an exemplary air movement cycle.

In the embodiments illustrated in FIGS. 5, 6 and 7, the synthetic jet actuator 200 is a substantially cylindrically shaped device. In the described embodiment, the synthetic jet actuator 200 is disposed partially within the cavities 116, 126 of the heat sink 104 and the driver body 106. In FIGS. 6 and 7, the synthetic jet actuator 200 provides for a cyclic air flow through the nozzles 105A, 105B to ingest and expel air such that the air is forced across the vertical fins 114T of the heat sink 104. In a first portion of the cycle, as shown in FIG. 6, air is ingested through nozzles 105A located along one side of driver body 106, as shown by arrows I, and expelled through nozzles 105B located along another side of the driver body 106, as shown by arrows E. In a second portion of the cycle shown in FIG. 7, the air flow is reversed. In this portion of the cycle, air is ingested through nozzles 105B as shown by arrows I, and expelled through nozzles 105A as shown by arrow E, in a manner opposite to that shown in FIG. 6. FIGS. 6 and 7 are provided by way of example; other air flows including different cycles may be used. For example, the synthetic jet actuator 200 and driver body 106 may be adapted to direct a flow of air out of a different arrangement of nozzles 105A, 105B in each portion of the cycle, e.g., an alternating arrangement of nozzles 105A, 105B, around the circumference of the driver body 106.

For this exemplary embodiment, each of the nozzles 105A, 105B is positioned adjacent to an end or terminal portion 118, of a vertical fin 114T and is oriented so as to direct the exiting air flow in the vertical direction along fin 114T. As such, air flow produced by the synthetic jet actuator 200 exits the nozzles 105A, 105B and aerodynamically scrubs the side surfaces of the vertical fins 114T. Furthermore, the airflow E expelled by the nozzles 105A, 105B entrains a quantity of air along arrows EA which significantly enhances the convective cooling provided by the synthetic jet actuator 200. While the amount of entrainment cannot be adequately depicted, empirical data shows that the additional airflow can increase by a factor of between five (5) and ten times (10), or between five hundred to one-thousand percent (500% to 1000%).

The synthetic jet actuator 200 depicted in FIGS. 5-11 of the present disclosure may be used with the exemplary lighting apparatus or lamp 100 shown in FIGS. 1 and 2. For this exemplary embodiment, the synthetic actuator 200 has been configured such that the lamp 100 has an A19 form factor. However, design configurations having different form factors could be used as well. As previously discussed, the synthetic jet actuator 200 is a propulsive device which produces pulses or jets of air I that are ultimately directed to nozzles 105A, 105B of the driver housing 106. The jets of air I travel alongside the vertical fins 114T to enhance heat transfer from the heat sink 104, actively cooling the emitter 103 and associated electronics. To this end, in one embodiment, the synthetic jet actuator 200 includes a pair of diaphragms 206 and 208 (FIGS. 6 and 7), which travel in opposition to force high-momentum air through the nozzles 105A, 105B (see FIG. 3) of the driver housing 106.

In the described embodiment, the diaphragms 206 and 208 enclose the ends of the synthetic jet actuator 200 and are sealed to structural/rigid annular rims 250, 252 (See FIGS. 9 and 10) which are, in turn, supported and spaced-apart by a central annular ring 226. In the context used herein, any structure, e.g., annular rims 250, 252, annular ring 226, which supports an active element of the synthetic jet actuator 200, e.g., a diaphragm 206, 208, a permanent magnet (described below), etc., may be referred hereinafter as part of the "annular housing" of the synthetic jet actuator 200.

Using a controlled, oscillating wave of electrical current provided through power supply wires 202 (FIG. 11), an electro-magnetic device oscillates the diaphragms 206 in a cyclic manner to create the actuator movements and the flow of air shown in FIGS. 6 and 7. More specifically, in one embodiment, the synthetic jet actuator 200 includes a plurality of permanent magnets 210, 212 (FIGS. 9 and 10) which are each connected to a back iron core 218 which, in turn, is attached to the interior of the annular housing 226. The back iron core 218 is constructed from, for example, mild steel and provides a conduit for the magnetic flux created by the magnets 210 and 212. The magnets 210 and 212 are each capped by flux plates 220 and 222, respectively.

Annular receivers 228, 230 (FIGS. 9 and 10) circumscribe and are spaced-apart from the permanent magnets 210, 212 and include copper coils 214, 216 wound about the periphery of the receivers 228, 230. The annular receivers 228, 230 each include a circular flange 229, 231 which centrally mounts to each of the diaphragms 206, 208, i.e., through a central aperture 232 (See FIG. 8). While flexible to accommodate motion, the diaphragms 206, 208 are sufficiently stiff to spatially suspend and/or center the annular receivers 228, 230 relative to the permanent magnets 210, 212. By passing an electrical current through the copper coils 214, 216, the receivers 228, 230 are moved away from or toward the permanent magnets 210, 212, which, in turn, move the diaphragms 206 and 208.

In the example of FIG. 6, the coils 214, 216 are repelled by the magnets 210, 212 causing the annular receivers 228, 230 to spread thereby causing the diaphragms 206, 208 to compress the air in the upper and lower chambers UC1, LC1. The upper chamber UC1 is generally defined by the upper diaphragm 206 and the interior surface 104S of the heat sink 104. The lower chamber LC1 is generally defined by the lower diaphragm 208 and the interior surface 106S of the driver housing 106. The opposing movement of the diaphragms 206, 208 simultaneously causes a vacuum to form in the intermediate chamber IC2 which is generally defined by and between the diaphragms 206, 208, in combination with the annular housing 226. This movement causes air to fill the intermediate chamber IC2 through the nozzles 105A.

FIG. 7 shows the coils 214, 216 being attracted by the magnets 210, 212 causing the annular receivers 228, 230 to move together and the diaphragms 206, 208 to compress the air in the central or intermediate chamber IC2. The movement of the diaphragms 206, 208 toward one another simultaneously causes a vacuum 100B to form in the upper and lower chambers UC2, LC1, and air to fill the chambers UC1, LC1 through the nozzles 105B.

A controller 280 produces an oscillating wave of electric current to the copper coils 214, 216 to move the respective diaphragms 206 and 208 toward or away from the permanents magnets 210, 212. The frequency, amplitude, and/or other characteristics of such movements are determined by the properties of the electrical current provided to coils 214, 216. To minimize the cost of the permanent magnets 210, 212 and iron core 218, in one embodiment, additional coils/windings may be employed. In one embodiment, a decrease in the size, number, and consequently, the cost of the permanent magnets 210 212, may be achieved by the use of additional coils 214, 216 or windings to operate in the reduced magnetic flux field produced by a less powerful array of permanent magnets 210, 212.

In the described embodiment, the synthetic jet actuator 200 of the present disclosure operates at less than about six cubic feet per minute (CFM) per watt. The term "watts of input power" generally refers to the power consumption of the synthetic jet actuator 200 and not necessarily the power required for operating the lamp 100. By configuring a synthetic jet actuator 200 for such efficiency values, lower cost may be achieved by using fewer, smaller and/or less expensive permanent magnet(s). In one embodiment, the emitter 103 and synthetic jet actuator 200 are configured to consume a quantity of electrical power that is greater than about 15 watts of input power. In one embodiment, the amount of power consumed is greater than about 20 watts of input power.

Figure 11:
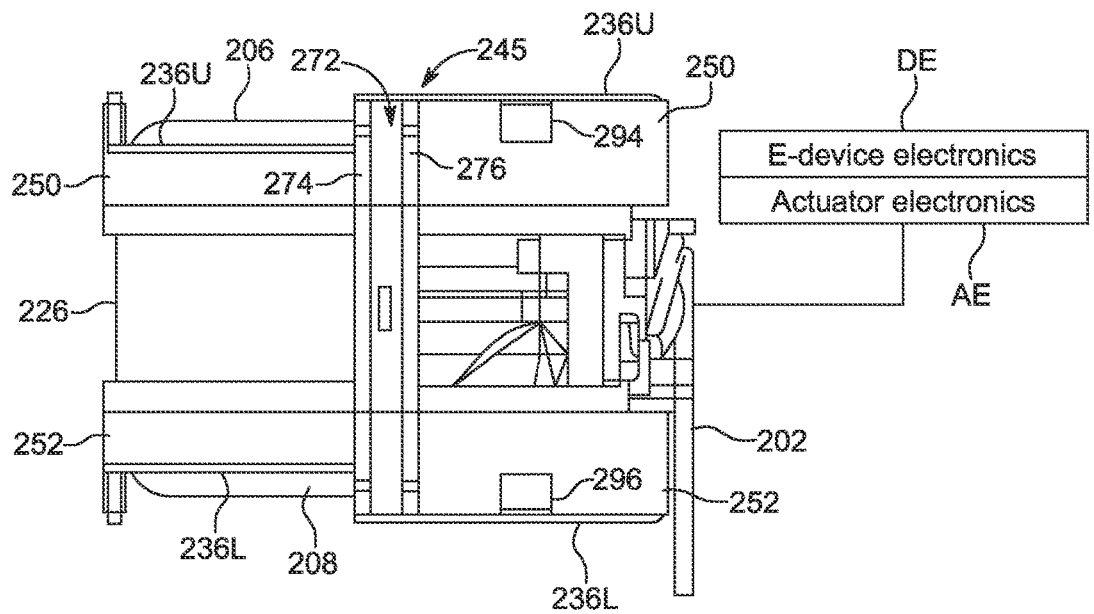
FIG. 11 is a side profile view of the embodiment of the synthetic jet actuator shown in FIG. 5 depicting exemplary sealing structures.

In the described embodiment, and referring to FIG. 11, the synthetic jet actuator 200 includes actuator electronics ("AE") disposed at an external or remote location. More specifically, in one embodiment, the actuator electronics AE may include an Application Specific Integrated Circuit (ASIC) disposed at a predefined location in the thermal management system 101. In the described embodiment, the actuator electronics AE is remotely located from the synthetic jet actuator 200 and/or co-located with the device electronics DE, i.e., the electronics which control and power the emitter 103. By moving the actuator electronics AE, which is normally disposed internally of the synthetic jet actuator 200 to a second/remote location, the size of the synthetic jet actuator 200 may be reduced. This is principally a matter of the internal volume of the synthetic jet actuator 200, inasmuch as fewer items within the annular housing 226 of the synthetic jet actuator 200 may permit a commensurate reduction in internal volume. Furthermore, the actuator electronics AE, which is a source of heat, may be co-located with the device electronics DE. As such, a portion of the cooling air from the synthetic jet actuator 200 may be routed to the synthetic jet actuator 200 and the device electronics AE, DE to more efficiently cool the electronics, and consequently, the lamp 100.

Figure 12:
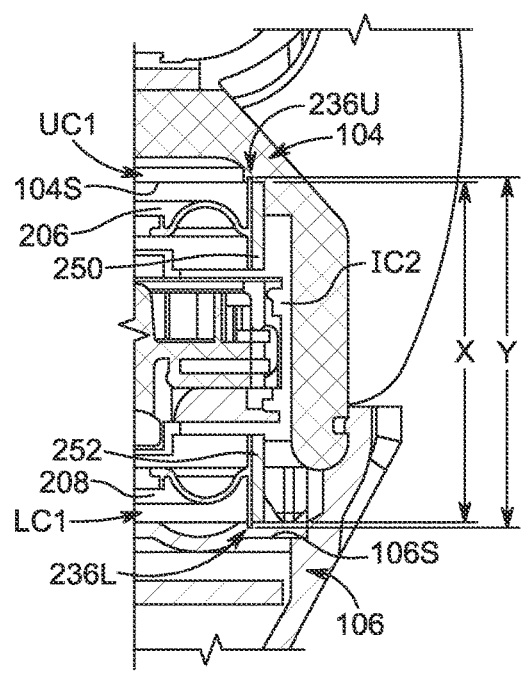
FIG. 12 is an broken-away sectional view of one embodiment of a heat sink and driver housing assembled in combination with the synthetic jet actuator.
Figure 13:
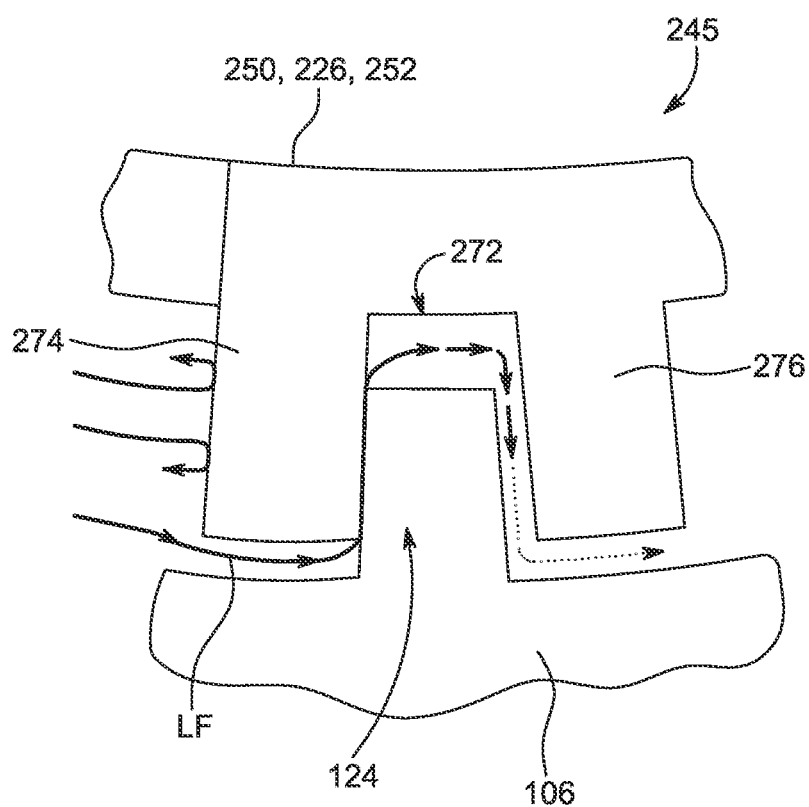
FIG. 13 depicts an enlarged broken-way view of one embodiment of a labyrinth seal for an actively-cooled lighting apparatus incorporating aspects of the present disclosure.

Returning to our discussion concerning the integration of the synthetic jet actuator 200, in the embodiments of FIGS. 8, 10, 11 and 12, the diaphragms 206, 208 are produced from a resilient, low-durometer, elastomer such as a silicone rubber. The elastomer may be bonded or otherwise integrated with the annular rims 250, 252 of the synthetic jet actuator 200 to define an actuator seal between the annular rims 250, 252 of the actuator 200 and one or more adjacent lamp structures to form each of the chambers UC1, LC1, IC2 (FIG. 12). In the described embodiment, the diaphragms 206, 208 may be integrated with the annular rims 250, 252 to function in the capacity of propulsive devices, sealing structures, and vibration dampers. In the preceding paragraphs, the role of the diaphragms 206, 208 as propulsive devices to move air into and out of the nozzles 105, has been described. However, the rims 236U, 236L of each of the diaphragms 206, 208 may also be adapted to function as the elastomer seal between the annular rims 250, 252 of the synthetic jet actuator 200 and one or more adjacent lamp structures to form each of the chambers UC1, LC1, IC2 (FIG. 12). Additionally, the rims 236U, 236L function as dampers to reduce or suppress vibrations which contribute to the noise produced by the synthetic jet actuator 200.

More specifically, the flexible rims 236U, 236L of each of the diaphragms 206, 208 are adapted to form a rim seal between the annular rims 250, 252 of the synthetic jet actuator 200 and the internal surfaces 104S, 106S of either the heat sink 104 along the top side of the synthetic jet actuator 200, and the driver housing 106 along the underside of the synthetic jet actuator 200. The flexible rims 236U, 236L may project over the annular rims 250, 252 of the synthetic jet actuator 200. In the context used herein, the phrase "over the annular housing" means that the flexible rims 236U, 236L may project dimensionally above, around, or wrap over the edge of the annular rims 250, 252 of the synthetic jet actuator 200.

While, in the described embodiment, the rims 236U, 236L are integrated with the diaphragms 206, 208, it will be appreciated that these elements may be separate and distinct. In one embodiment, the rims 236U, 236L may be molded in combination with the edge of the annular rings 250, 252 while the diaphragms 206, 208 may be independently molded and subsequently bonded/sealed to an inner surface of the annular housing 226 including annular rims 250, 252. Integration of the elements, however, provides a unique opportunity to simplify and reduce the cost of actuator manufacture.

In FIG. 12, the thermal management system is fabricated such that assembled dimensions of the heat sink 104 and driver housing 106, i.e., the vertical dimensions X between the underside surface 104S of the heat sink 104 and the mating surface 106S of the driver housing 106, are undersized relative to the fabricated dimensions of the synthetic jet actuator 200, i.e., the vertical Y dimension between the upper and lower rims 236U, 236L of the diaphragms 206, 208. As such, upon assembly, the rims 236U, 236L are pressed between the heat sink 104 and driver housing 106, i.e., from the unassembled dimension Y to the assembled dimension X, to form the upper and lower rim seals between the synthetic jet actuator 200, the heat sink 104 and driver housing 106. As a consequence, there is no need for a separate O-ring seal between the synthetic jet actuator 200 and the heat sink 104 and driver housing 106 inasmuch as the diaphragms 206, 208 function as both actuation and sealing devices. Additionally, the diaphragms 206, 208 reduce noise by damping vibration in the audible range.

While the present disclosure describes a synthetic jet actuator 200 as having a pair of diaphragms 206, 208 defining essentially three (3) chambers, i.e., an upper chamber UC1, a lower chamber LC1 and an intermediate chamber IC2, it should be appreciated that the teachings described herein are equally applicable to synthetic jet actuator 200 having a single oscillating diaphragm, or more than two (2) diaphragms, as shown in the present embodiments, to pulse air into and out of multiple chambers.

The integration of the synthetic jet actuator 200 presents additional challenges relating to the creation of the necessary airflow passageways, i.e., to produce the flow of air through select nozzles 105 of the driver housing 106. Additionally, the lighting apparatus 100 must facilitate manufacture and assembly of the synthetic actuator 200 in combination with the heat sink 104 and the driver housing 106. With respect to the latter, adequate clearance must be provided to allow components to be assembled with relative simplicity and ease.

Figure 8:
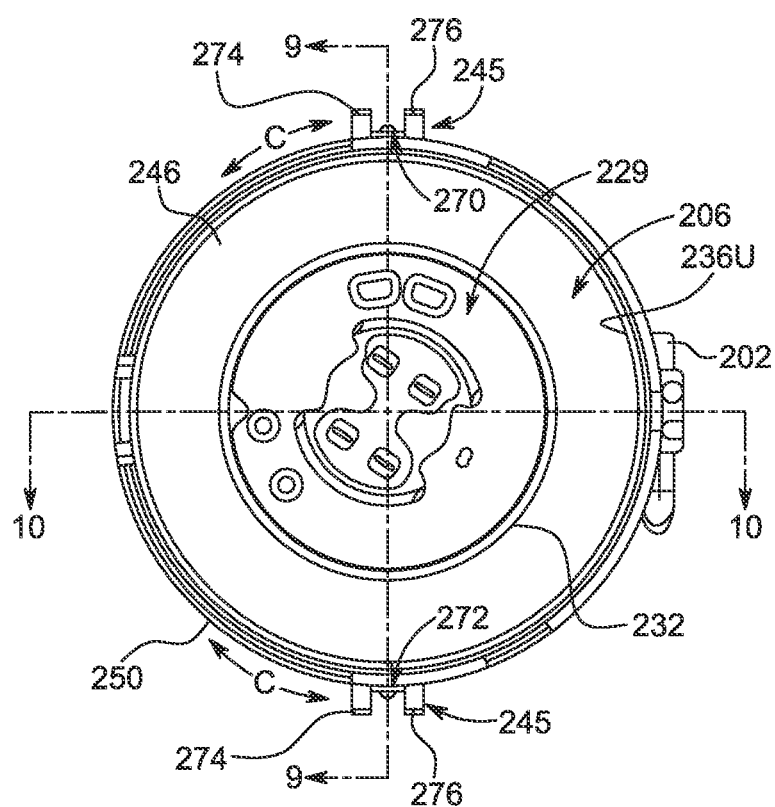
FIG. 8 is a top plan view of the embodiment of the synthetic jet actuator shown in FIG. 5.

More specifically, and referring to FIGS. 3, 8, 11, and 13 of the drawings, in one embodiment, the rim seals 236U, 236L (FIGS. 8, 11) are integrated with the diaphragms 206, 208 to prevent airflow across chambers, i.e., from the intermediate chamber IC2 to one or both of the upper and/or lower chambers UC1, LC1 or visa-versa. In one embodiment, the driver housing 106 includes a labyrinth seal 245A positioned on one side of actuator 200 at the end of the first portion 250 of rim 236U. In the example of FIG. 8, another labyrinth seal 245B is positioned on the opposite side of the synthetic jet actuator 200, at the end of first portion 252 of rim 236L. Seal 245A is constructed from a pair of axially extending bars 274A, 276A forming a channel 270 therebetween. Similarly, seal 245B is constructed from axially extending bars 274B, 276B forming channel 272 therebetween. The labyrinth seals 245A, 245B are incorporated between the actuator 200 and the driver housing 106 to prevent cross-flow between the first and second nozzles 105A, 105B (FIG. 3). In one embodiment, the labyrinth seals 245A, 245B prevent airflow in a circumferential direction C around the exterior periphery of the annular housing 226. In FIGS. 8 and 11, the channels 270, 272 are defined by a pair of radial web members formed along the periphery of the annular housing 226, 250, 252 and an adjacent lamp structure, e.g., a inwardly projecting flange or tongue 124A, 124B (see FIG. 3), for engaging the channels 270, 272, respectively. The channels 270, 272 and tongues 124A, 124B are vertically oriented and parallel to the longitudinal axis 100A (FIG. 3) of the actively-cooled lamp 100. During assembly, channels 270, 272 and received tongues 124A, 124B are mounted in an opposing manner along an interior surface of heat sink 104. The complementary joining between the synthetic jet actuator 200 and heat sink 104 provides a sealing effect, which in one embodiment, can be used to control air flow.

In the described embodiment, the channels 270, 272 are formed by first and second pairs of radial web members 274A, 276A and 274B, 276B disposed on opposite sides of the synthetic jet actuator 200. The web members 274A, 276A and 274B, 276B are parallel to an axis of symmetry 290A (see FIG. 3) which is co-linear with the longitudinal axis 100A. The tongues 124A, 124B are formed by a single flange projecting inwardly from the driver housing 106. To facilitate manufacture, the radial web members 274A, 276A and 274B, 276B are molded in combination with the annular housing 226 including rims 250, 252 of the synthetic jet actuator 200. It is anticipated that relief surfaces (not identified in the figures) of the radial web members 274A, 276A and 274B, 276B may be best suited for a female mold from which the driver housing 106 will be produced. That is, the web members 270, 272 will not form a mechanical lock preventing release of an annular housing 226 and rims 250, 252 upon being injection molded by a thermoplastic material.

Similarly, the relief surfaces (also not identified in the figures) of the tongues 124A, 124B of the driver housing 106 may be more suitable for fabrication within a male mold from which the driver housing 106 is anticipated to be fabricated. That is, in one embodiment, the inwardly projected flanges or tongues 124A, 124B will not form a mechanical lock preventing the fabrication or release from an injection mold.

To facilitate assembly, in one embodiment, the labyrinth seals 245A, 245B are aligned with a vertical bifurcating plane which includes the central axis 100A of the lamp and/or the axis of symmetry 290A (FIG. 3) of the synthetic jet actuator 200. The channels 270, 272 are slightly oversized relative to the tongues 124A, 124B such that the synthetic jet actuator 200 may be inserted vertically downward into, and from the open end of, the driver housing 106. Referring to the exemplary illustration in FIG. 13, as pressure or vacuum builds in the central chamber IC2, air (shown as arrow LF in FIG. 13) flows through the labyrinth seal 245B, i.e., the passageway between the web members 274B, 276B, and the tongue 124B. The viscosity of the air produced by the labyrinth seal 245B in this example, i.e., across the boundary layer, resists airflow sufficiently to effect a virtual seal which inhibits flow in a circumferential direction. As a result, the labyrinth seals 245A, 245B allow pressure and/or a vacuum to develop in the respective chambers UC1, LC1, IC2 (FIG. 12) which, in turn, forces a flow of air through select nozzles 105A or 105B of the driver housing 106.

Accordingly, the synthetic jet actuator 200 has been adapted to provide an actuator seal which inhibit a combination of vertical and circumferential flow to define the upper, lower and intermediate chambers UC1, LC1, IC2. In one embodiment, the rims seals 236U, 236L in combination with the mating surfaces 104S, 106S, prevent vertical flow between the chambers UC1, LC1, IC2. Further, the channels 270, 272 in combination with the flanges 124A, 124B form the labyrinth seals 245A, 245B to prevent circumferential airflow across the chambers UC1, LC1, IC2.

Figure 9:
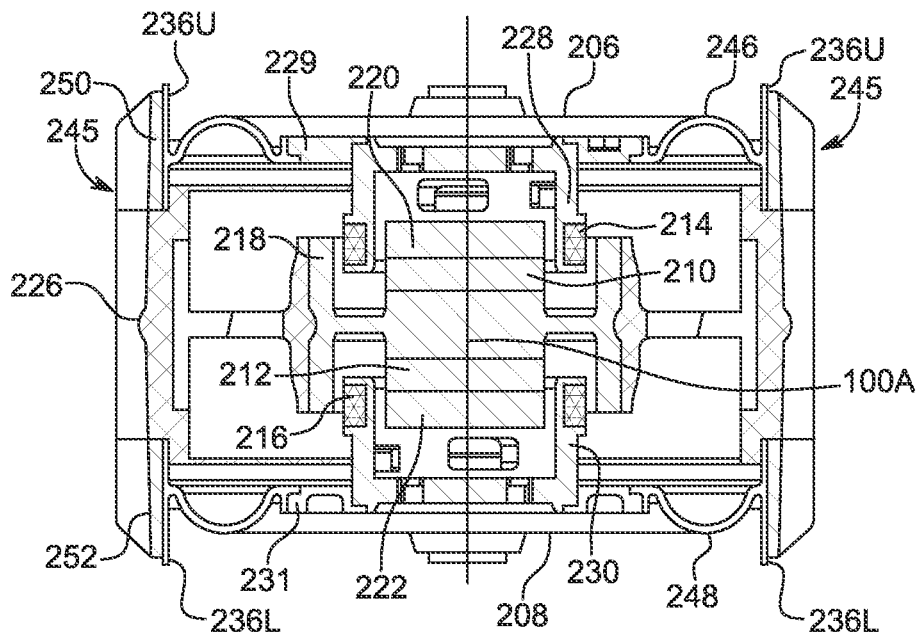
FIG. 9 is a cross-sectional view of the synthetic jet actuator of FIG. 8, taken substantially along line 9-9 of FIG. 8.
Figure 10:
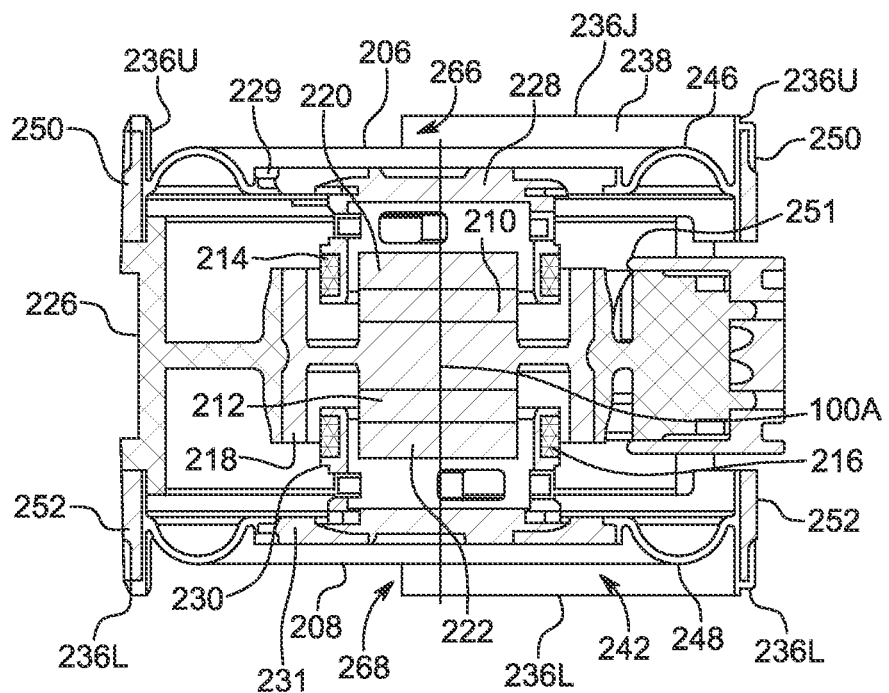
FIG. 10. is a cross-sectional view of the synthetic jet actuator of FIG. 8, taken substantially along line 10-10 of FIG. 8.

In one embodiment, referring to FIGS. 9 and 10, the diaphragms 206, 208 include arcuate portions or bellows 246, 248. The bellows 246, 248 of the diaphragms 206, 208 may be molded, in place, with the rims 250, 252 of the annular housing 226. During fabrication, in one embodiment, each of the rims 250, 252 is placed in an injection mold including a cavity defining a space for fabricating the diaphragms 206, 208. Furthermore, as illustrated in FIG. 5, apertures 294, 296 are formed in the rims 250, 252. Inasmuch as the elastomer is injected as a B-stage flowable polymer, the apertures 294, 296 function as additional volume for accepting overflow or expansion of the polymer during injection and/or during the cure cycle of the elastomer. More specifically, the windows 294 and 296 function as a relief area for the elastomer injected into the mold and/or as an area for thermal expansion. While the description discusses the fabrication of both diaphragms 206, 208 simultaneously within a mold, it should be appreciated that the mold may form each diaphragms independently, i.e., one diaphragm per mold assembly.

Referring again to the exemplary embodiment illustrated in FIGS. 9, 10, and 11, the arcuate bellows 246 and 248 of the diaphragms 206, 208 project outwardly in an opposing manner from each other along the longitudinal axis 100A of the lighting apparatus/lamp 100. More specifically, the arcuate bellows 246, 248 define a convex external profile, and a concave internal profile, to prevent contact with internal components, e.g., an edge 251 of an internal structure or other internal electronics (not shown).

In summary, an electronically-operated device is actively-cooled by the integration of a synthetic jet actuator 200 incorporating aspects of the disclosed embodiments. In one embodiment, the synthetic jet actuator 200 is configured to cyclically ingest and expel air through select nozzles of distributor driver housing and direct the cooling air across a heat sink of the electronically-operated device. The synthetic jet actuator includes remotely-located electronics to reduce the space requirements of the design envelope and improve thermal efficiency. Rim seals are integrated with an elastomer diaphragm to produce each of the propulsive air chambers while reducing the audible noise produced by the actuator.

A labyrinth seal is employed to inhibit circumferential airflow across the air chambers while facilitating manufacture of the annular housing of the synthetic jet actuator. Further, the labyrinth seal facilitates assembly of the synthetic jet actuator in combination with the housing of the electronically-operated device. Each diaphragm includes a bellows ring having a concave curvature to maximize the internal space available for diaphragm movement. As such, actuator noise is mitigated by abatement of airflow across/through narrow passageways internally of the synthetic actuator.

Additionally, in one embodiment, windows are produced in annular rims of the housing to enable the in-situ fabrication of the flexible diaphragm with the annular rim. Finally, the integration of the synthetic jet actuator with a lighting apparatus enables favorable trade-offs between the cost of permanent magnets and the current available to produce the airflow to cool the lighting apparatus.

Many solid-state light sources employed in accordance with embodiments of this disclosure, such as light emitting diode (LED) devices, in general, emit light in a Lambertian distribution. Therefore, embodiments of the actively-cooled lamps described above have been provided with optical elements which may include diffusers, etc., so as to achieve a wider and more uniform optical intensity distribution than lamps of the prior art. Such optical elements, however, often cause additional light losses that must be compensated for, requiring special provisions in the design. As will be discussed in greater detail hereinafter, increased optical efficiency and uniformity can be achieved by implementing: (i) a weak diffusing lens cover to absorb less light, (ii) a specular reflector positioned in opposed relation to the LED emitters, (iii) a shaped reflector having a shape which reflects light from the emitter to the diffuser, (iv) a highly-reflective mounting arrangement to hold the emitter and/or the connecting wires. Optical efficiency may be further enhanced by coating the exposed surfaces of wires proximate the emitter with a highly reflective material, positioning or shielding the wires under a cover or frame which is highly reflective.

Figure 14:
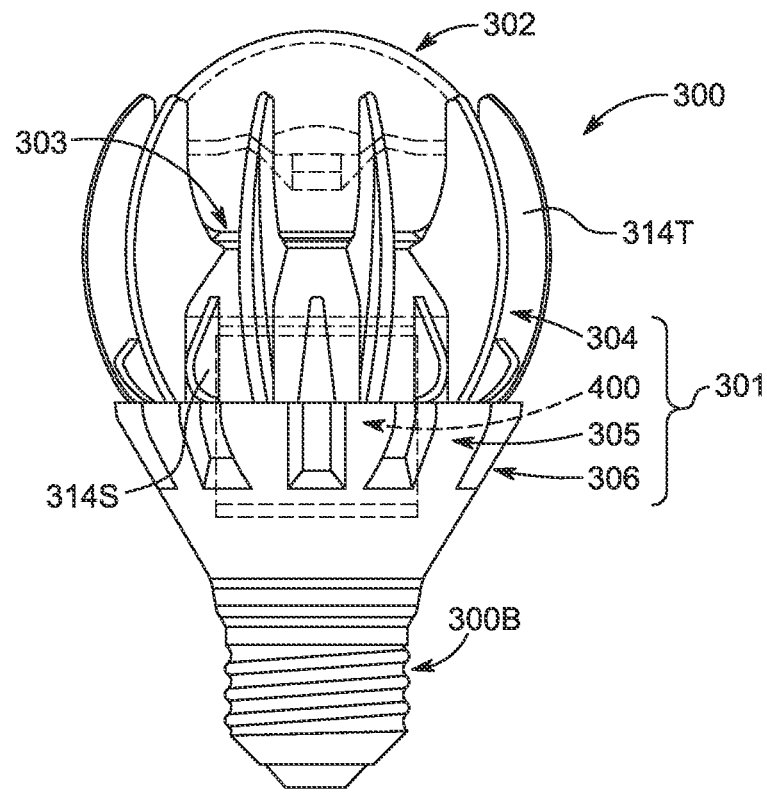
FIG. 14 is a perspective view of another embodiment of an actively-cooled lighting apparatus incorporating aspects of the present disclosure.

In FIG. 14, an actively-cooled lamp 300 according to a first embodiment includes an optical element 302, an emitter 303 producing a source of light for transmission through the optical element 302, and a thermal management system 301. In the embodiment shown in FIG. 14, the thermal management system 301 includes a heat sink 304 disposed in thermal communication with the emitter 303, a housing 306, also referred to herein as a "driver housing", having a plurality of nozzles 305 for directing a flow of air across the heat sink 304, and a synthetic jet actuator 400 for cyclically ingesting and expelling a flow of air through the nozzles 305. The integration and operation of the synthetic jet actuator 400 in the actively cooled lamp 300 is essentially identical to the synthetic jet actuator 200 described earlier herein. Similarly, the control of airflow through select nozzles 305 of the housing 306 is essentially identical, hence, for the sake of simplicity, no further discussion will be provided.

Figure 15:
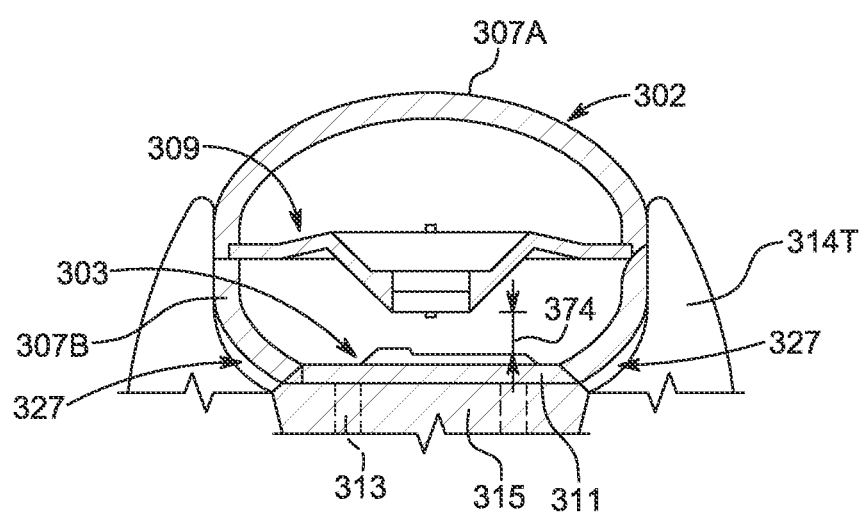
FIG. 15 is an enlarged broken-away sectional view of one embodiment of an optical element incorporating aspects of the present disclosure.

In the embodiment illustrated in FIG. 15, the heat sink 304 includes a plurality of vertical fins 314T which project upwardly from a base portion 315 of the inverted cup-shaped heat sink 304. In the described embodiment, the heat sink 304 includes between eight (8) and ten (10) vertical fins 314T which are equiangular about a longitudinal axis 300A of the lamp 300. In the embodiment shown in FIG. 15, the vertical fins 314T project upwardly beyond the reflector 309 of the optical element 302 and are contoured to conform essentially to the form factor of the ANSI A19 lamp profile. The heat sink 304, which may also be referred to as a "buttress-style" heat sink, may also include a plurality of smaller fins or finlets 314S, shown in FIG. 14, disposed between the vertical fins 314T, i.e., an alternating arrangement of vertically tall and small fins 314T, 314S. As such, the finlets 314S function to dissipate heat, along with the tall vertical fins 314T, without degrading the optical efficiency of the lamp 300.

While the vertical fins 314T may define an edge contour which complements the spline curvature or ovoid shape of the optical element 302, the vertical fins 314T are spaced-apart from the lower portion of the optical element 302 to produce an optical gap 327 therebetween. While the surface area along the gap 327 of optical element 302 is seemingly small in comparison to the overall surface area of the optical element 302, the additional area/space afforded by the gap 327 increases the intensity of light disseminated from the diffuser optical element 302. This gap 327 is significant in the context of Energy Star™ requirements, which require substantially uniform light distribution from zero degrees (0°) to one-hundred and thirty-five degrees (135°) measured from a top of the lamp 300 to its base 300B. The gap 327, therefore, permits light distribution in the lowermost regions near one-hundred and thirty-five degrees (135°).

Figure 16:
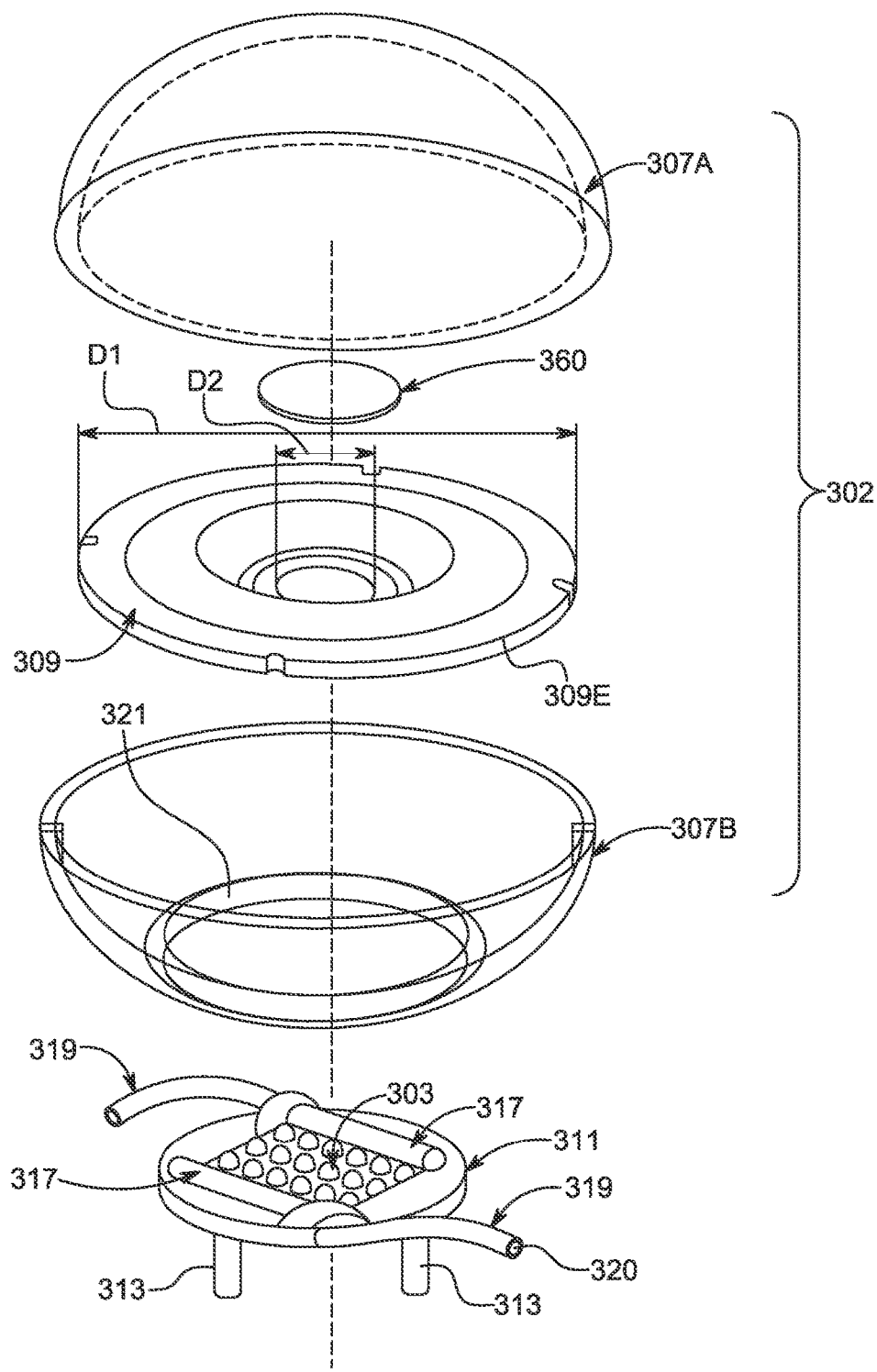
FIG. 16 is an exploded perspective view of one embodiment of an assembly the optical element and a fitting for securing an emitter in combination with the optical element.

In the embodiments of FIGS. 15 and 16, the optical element 302 includes a diffuser 307 and a reflector 309 that is spatially positioned centrally within the diffuser 307. In the described embodiment, the reflector 309 is disposed internally of the diffuser 307 and is spaced-apart from the emitter 303. The emitter 303 may be any suitable light source and is preferably one or more light emitting diodes (LEDs). In one embodiment, the emitter 303 is a planar array of LEDs on a circuit board (not shown).

The diffuser 307 comprises first and second dome segments 307A, 307B which capture an outer edge 309E (FIG. 16) of the reflector 309 about a horizontal plane. In one embodiment, the first and second dome segments 307A, 307B are split along the horizontal plane and, upon assembly, capture and suspend the reflector 309 between the dome segments 307A, 307B. Additionally, the emitter 303 mounts to a fitting 311 having posts 313 which engage the heat sink 304 (FIG. 14). The fitting 311 may include pre-molded conduits or covers 317 (FIG. 16) which accept the power supply wire(s) 319 which power the emitter 303. To minimize light absorption by the power supply wire(s) 319, the wire cover 317 comprises an electromagnetically reflective material. Furthermore, inasmuch as the wire cover 317 is disposed over the power supply wire 319, the cover 317 also protects a user from the hazards of electric current and/or voltage. Additionally or alternatively, the wire sheathing 320 of the power supply wire(s) 319 includes a color and/or a coating which is reflective.

In the embodiment of FIG. 16, the diffuser 307 comprises a light-transmissive material. The material from which the diffuser 307 is fabricated may include a transmissive polymer material, e.g., a polycarbonate, e.g., one or more of Teijin 5206, Teijin 5210, Bayer FR7067, Sabic LEXAN, or the like. A phosphor, or other luminescent material, may optionally be applied to at least one surface of the diffuser 307 and/or integrated within a material that forms the diffuser 307, to convert some or all of light from the emitter 303 to a different wavelength.

In one embodiment, the diffuser 307 has a substantially ovoid shape, graphically generated by a free-form curve or mathematically produced by a spline curve. While the shape is preferably ovoid, it should be appreciated that the diffuser 307 may have any curvilinear geometry including a dorsal or elliptical shape. Further, the overall size and shape of the diffuser 307 will vary depending on the application and/or size of the actively-cooled lamp 300. An opening 321 may be provided at the base of the second dome segment 307B, which may be integrated with a substrate material which circumscribes the emitter 303. Alternatively, the opening 321 may be mounted in combination with the fitting 311 which mounts the emitter 303.

In this exemplary embodiment, the reflector 309 is annular and has a circumferential shape corresponding to the inner perimeter of the dome segments 307A, 307B at the horizontal plane of the diffuser 307. The rim or edge of the reflector 309 may be friction-fit or snap-fit within the diffuser 307. Additionally or alternatively, the outer edge 309E of the reflector 309 may be coupled with the diffuser 307 using a sonic weld and/or a luminescent (or transparent) adhesive.

Figure 17:
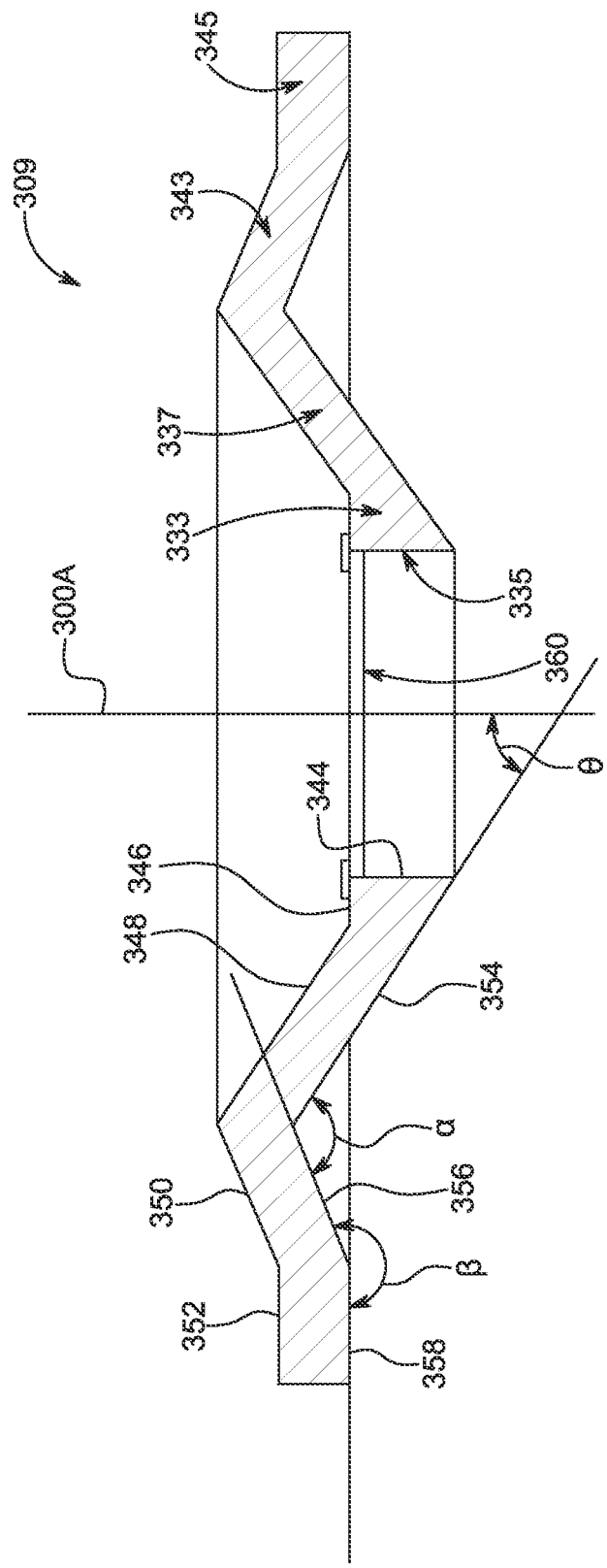
FIG. 17 is an enlarged cross-sectional view of the annular reflector of the optical element.

Referring to FIG. 17, in one embodiment, the reflector 309 comprises (i) a planer inner rim 333 having a coaxial aperture 335 therein, (ii) a first frustoconical surface or wall 337 coupled to, and disposed radially outboard of, the inner rim 333, (iii) a second frustoconical surface or band 343 coupled to, disposed radially outboard of, and inverted relative to, the first frustoconical wall 337, and (iv) a planar outer surface or rim 345 coupled to, and disposed radially outboard of, the second frustoconical wall 343. The surface of the reflector 309 defines angles θ, α, β which are selected to optimally distribute, i.e., uniformly distribute, light transmitted by the optical element 302. Inasmuch as the upper and lower surfaces of the reflector 309 are essentially parallel, but separated by the thickness of the wall, only the angles θ, α, β along the underside of the reflector 309 need to be defined. Furthermore, to establish a reference coordinate system, at least with respect to a first surface of the reflector 309, the longitudinal axis 300A shall be deemed a zero degree (0°) line of reference and wherein rotation in a counterclockwise direction about a point P represents positive angles.

In one embodiment, the first frustoconical wall 337 defines the first angle θ relative to the longitudinal axis 300A, the second frustoconical band 343 defines the second angle α relative to the first frustoconical wall 337, and the planar out rim 345 defines the third angle β relative to the second frustoconical band 343. By way of example, and not limitation, the first angle θ is within a range of between about thirty degrees (30°) to about fifty degrees (50°); the second angle α is within in a range of between about one-hundred and fifteen degrees (115°) to about one-hundred and twenty-five degrees (125°); and the third angle β is within a range of between about one-hundred and eighty (180°) to about one-hundred and eighty-five degrees (185°).

The aperture 335 in the inner rim 333 provides an unobstructed opening for light produced by the emitter 303 to pass into the upper dome segment 307A of the optical element 302. The diameter ratio between the outer rim diameter D1 and the inner rim diameter D2 is within a range of between about three to one (3:1) to about three and a half to one (3.5:1).

Inasmuch as there is no optical gap between the outer rim 345 and the diffuser 307, light cannot traverse the edge of the reflector 309. Consequently, light must travel to the top portion of the diffuser 307 either by a direct line of travel through the inner aperture 335, or by reflection internally of the lower dome segment 307B and, finally, through the aperture 335. Light can, of course, exit the optical element 302 by passing through the lower dome diffuser 307B. As mentioned above, it is an objective to produce an optical element which distributes light uniformly within an angular profile between zero degrees (0°) and one-hundred and thirty-five degrees (135°).

In one embodiment, the reflector 309 is preferably molded as a single piece using known manufacturing and molding techniques. Alternatively, the reflector 309 can be assembled from multiple pieces of material. The material of construction for the reflector 309 may vary widely, and may include molded plastic (e.g., Teijin 3010, Teijin 3050, DSM LED 1551, Bayer FR6487, FR6091, Kuraray TA112, and TA113), highly polished materials, highly specular vacuum metallized materials, ALANOD with a silver coat, plastic or metal reflectors covered with a reflective sheet, or materials with a powder coat such as VALSPAR, PTW90135 or ICI paint; or the like. Preferably, at least one surface 344, 346, 348, 350, 352, 354, 356, and/or 358 of the reflector 309 is specular. For example, in one exemplary embodiment, at least the lower surfaces of the first and second frustoconical surfaces 337, 343 are specular. In this embodiment, the upper surfaces of the first and second frustoconical surfaces 337, 343 may be either specular or diffusive.

Any of the surfaces 344, 346, 348, 350, 352, 354, 356, and/or 358 can be made specular by polishing and/or applying a coat of a specular material. Non-limiting examples of materials which are specular, or which can produce a specular surface include: molded plastics (e.g., Teijin 3010, Teijin 3050, DSM LED 1551, Bayer FR6487, FR6091, Kuraray TA112, and TA113) from highly polished tool, highly specular vacuum metallized parts, ALANOD with silver coat, or plastic or metal reflectors covered with 3M reflective sheet; or the like. The surfaces 344, 346, 348, 350, 352, 354, 356, and/or 358 may be made diffusive by the application of known diffusive material, which may include many known diffusive materials. Thus, in one example, the reflector 309 may be a plastic reflector having a surface coupled with a sheet of specular material. In one embodiment, a sheet of specular material covers a surface of the annular rim 346. In another embodiment, the specular material is absent from the rim surfaces 344 and 346. In another example, the reflector 309 may be metallized on one or both sides. The annular rim surfaces 344 and 346 may be metallized or not. Thus, in one embodiment of the reflector 309, the surfaces 348, 350, 352, 354, 356, and/or 358 will be metallized, however, the annular rim surfaces 344, 346 will not be metallized. In another embodiment, the reflector 309 can be polished until it is partially specular. In the context used herein, "partially specular" means that the surface is about ninety-five percent (95%) specular/reflective and five percent (5%) diffusive.

In one embodiment, a highly polished mold produces a reflector 309 having at least one surface that is specular. In another embodiment, surfaces of the reflector 309 which are proximate the emitter 303 are specular, while the opposite surfaces are diffusive. A material, such as a plastic, that forms the reflector 309 may absorb blue wavelengths of light emitted from the emitter 303 to create a warmer light. As one non-limiting example, a material forming the reflector 309 may convert emitted light of 3,000K to warmer reflected light of 2,800K. Thus, the material(s) that form the reflector 309 can be selected to make the reflected light warmer than the emitted light.

By making select surfaces of the reflector 309 diffusive, i.e., the central portion of the reflector 309, a light spike on the diffuser 307 may be eliminated. Depending on the size of the aperture 335, the diffusive surfaces of the reflector 309 may be entirely eliminated. For example, the diffusive surfaces may not be required when the aperture 335 is sufficiently small.

In the illustrated embodiments shown in FIGS. 15 and 16, the reflector 309 includes a scattering sheet 360 comprising a surface scattering material having partial transmission and reflection characteristics. Non-limiting examples of a surface scattering material may include many known light diffusing materials, e.g., OPTIGRAFIX DFMM film or the like. The scattering sheet 360 rests on, and/or is coupled with, the lip 333. When the reflector 309 is spatially positioned internally of the diffuser 307, the scattering sheet 360 is coaxially aligned with the emitter 303. Accordingly, some rays of light from the emitter 303 pass through the scattering sheet 360, essentially unaffected, and travel towards the upper or first dome segment 307A of the diffuser 307. Other rays of light are reflected within the lower or second dome segment 307B of the diffuser 307.

To ensure that the rays of light are optimally distributed by the optical element 302, the reflector 309 is separated from the emitter 303 by a small gap 374. The gap, measured from the lowermost edge of the first frustoconical wall 337 to the emitter 303, is within range of between six millimeters (6 mm) to about 10 millimeters (10 mm).

The embodiments of the actively-cooled lamps 100, 300 described herein are sized and shaped to conform essentially to the form factor of the A19 lamp profile. However, embodiments of the present disclosure and the principles of its design/operation are not limited to this envelope. Rather, they are applicable to all suitable lamp profiles in general. Such lamp envelopes include: an A series (e.g., A19), B series, C-7/F series, G series, P-25/PS-35 series, BR series, R series, RP-11/S series, PAR series, T series, and MR-n series.

Any of the actively-cooled lamps may be designed as direct "plug in" components that mate with a lamp socket via: (i) a threaded Edison base connector (sometimes referred to as an "Edison base" in the context of an incandescent light bulb); (ii) a bayonet type base connector (i.e., bayonet base in the case of an incandescent light bulb), or (iii) standard base connectors which receive standard electrical power (e.g., 110 volts A.C., 60 Hz in the United States; or 220V A.C., 50 Hz in Europe; or 12, 24 or other DC voltage source). Since the actively cooled lamps of this disclosure do not rely predominantly upon conduction for its heat dissipation requirements, the actively cooled lamps of this disclosure may be used in any standard threaded light socket without concern for thermal loading of the socket, or adjacent hardware.

Actively-cooled lamps in accordance with the embodiments of this disclosure may be particularly well-suited for retrofit of higher wattage incandescent bulbs, such as incandescent bulbs in the 60 W to 100 W power range. In accordance with some aspects of the present disclosure, the actively-cooled lamps may provide a lumen output of at least 600 lumens, and in some embodiments, at least 1800 lumens, or in some cases even higher lumen output. For example, certain actively-cooled lamps in accordance with the present disclosure may output substantially the same lumens as a standard 100 watt tungsten filament incandescent lamp, but at a fraction of the power input (e.g., when driven at approximately 27 W). Furthermore, embodiments of the present disclosure may provide an expected L70 lifetime of at least about 25,000 hours, and preferably up to about 50,000 hours.

In general, actively-cooled lamp embodiments of the present disclosure are capable of simultaneously achieving all of the following parameters when in operation: (i) a lumen output of 1600 lumens or greater (e.g., greater than 1700 lumens); (ii) an omnidirectional distribution of emitted light (e.g., illumination across a latitude spanning from zero degrees (0°) to one-hundred and thirty-five degrees (135°) which is uniform in intensity within about +/−20%); (iii) a geometry which satisfies an A19 envelope (or which conforms to an ANSI A19 volumetric profile); (iv) possesses sufficient cooling ability for an efficiency of at least 60 LPW (e.g., >65 lumens per Watt) and/or (v) an L70 lifetime of at least about 25,000 hours. Optionally, the actively-cooled lamps of the present invention may also further simultaneously exhibit a correlated color temperature for light emitted 2700K to 3000K. Optionally, the actively cooled lamps of the present invention may further simultaneously exhibit a color rendering index for light emitted of greater than about 80.

In the context used herein, the phrase "solid state emitter" also means a "solid state light emitting source". Furthermore, it should be understood that, in the context used herein the term "air" means any fluid which may be suitable for heat dissipation.

In summary, the optical element includes a central reflector disposed at a mid-plane location within an ovoid-shaped diffuser. The reflector includes a surface which is selectively shaped to reflect and diffuse light for transmission through the diffuser. The reflector includes a central aperture which provides an unobstructed opening for light to pass into the upper dome segment of the optical element. Further, the reflector is disposed a select distance/gap from the light producing emitter to allow a portion of the light to project through the aperture and another portion to be reflected/redirected out of other portions of the diffuser. Moreover, a heat sink is spaced apart from the diffuser to provide gaps which enable light to be transmitted uniformly in the desired field of light projection.

Accordingly, the (i) shape and specular properties of the reflector, (ii) size of the aperture opening, (iii) spatial relationship of the emitter relative to the reflector, (iv) spatial relationship of the heat sink relative to the diffuser, produce an optical element which is highly efficient and which provides a uniform distribution of light in the desired field of light projection.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit and scope of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment. It is the intention, therefore, to be limited only as indicated by the scope of the claims appended hereto.

What is claimed is:

1. An optical element for transmission of light produced by a solid state emitter, comprising:
    at least one diffuser element; and
    a reflector supported by the at least one diffuser element and spaced-apart from the emitter;
    the reflector defining an annular lip having an aperture therein and an axis normal to a plane defined by the aperture, the annular lip having a planar inner rim, the reflector comprising:
        a first frustoconical surface coupled with the planar inner rim of the annular lip, the first frustoconical surface extending outwardly from the annular lip in a first direction and at a first angle relative to the axis;
        a second frustoconical surface coupled to the first frustoconical surface and extending outwardly at a second angle relative to the first frustoconical surface in a second direction; and
        a third frustoconical surface coupled with the second frustoconical surface and extending outwardly at a third angle relative to the second frustoconical surface, wherein the third frustoconical surface is disposed substantially horizontally relative to the axis and a surface of the third frustoconical surface is on a same horizontal plane with a surface of the annular lip.

2. The optical element according to claim 1, wherein the first angle is within a range of between about 30 degrees to about 50 degrees.

3. The optical element according to claim 1, wherein the second angle is within a range of between about 115 degrees to about 125 degrees.

4. The optical element according to claim 1, wherein the third angle is within a range of between about 180 degrees to about 185 degrees.

5. The optical element according to claim 1, wherein the reflector defines an outer rim diameter D1, and the aperture of the reflector defines an inner rim diameter D2 and wherein the diameter ratio between the outer and inner rim diameters D1:D2 is between about three to one (3:1) to about three and one-half to one (3.5:1).

6. The optical element according to claim 1, comprising wires for powering the emitter and a reflective cover disposed over the wires to prevent absorption of light energy.

7. The optical element according to claim 1, wherein at least one of the first frustoconical surface, the second frustoconical surface and the third frustoconical surface is diffusive.

8. The optical element according to claim 1, wherein at least one of the first frustoconical surface, the second frustoconical surface and the third frustoconical surface is specular.

9. The optical element according to claim 1, wherein the first frustoconical surface is diffusive and the second frustoconical surface is specular.

10. A lighting apparatus, comprising:
an optical element;
an emitter for producing light for transmission by the optical element;
a heat sink in thermal communication with the emitter;
wherein the optical element includes a reflector spaced-apart from the emitter, the reflector defining an annular lip having an aperture therein and an axis normal to a plane of the aperture, the annular lip having a planar inner rim, the reflector defining a first frustoconical surface coupled with the planar rim of the annular lip and extending outwardly from the annular lip in a first direction and at a first angle relative to the axis, a second frustoconical surface coupled to the first frustoconical surface and extending outwardly at a second angle relative to the first frustoconical surface in a second direction; and a third frustoconical surface coupled with the second frustoconical surface and extending outwardly at a third angle relative to the second frustoconical surface, wherein the third frustoconical surface is disposed substantially horizontally relative to the axis and a surface of the third frustoconical surface is on a same horizontal plane with a surface of the annular lip.

11. The lighting apparatus according to claim 10, wherein the first angle is within a range of between about 30 degrees to about 50 degrees.

12. The lighting apparatus according to claim 10, wherein the second angle is within a range of between about 115 degrees to about 125 degrees.

13. The lighting apparatus according to claim 10, wherein the third angle is within a range of between about 180 degrees to about 185 degrees.

14. The lighting apparatus according to claim 10, wherein the reflector defines an outer rim diameter D1, and the aperture of the reflector defines an inner rim diameter D2 and wherein the diameter ratio between the outer and inner rim diameters D1:D2 is between about three to one (3:1) to about three and one-half to one (3.5:1).

15. The lighting apparatus according to claim 10, comprising wires for powering the emitter and a reflective cover disposed over the wires to prevent absorption of light energy.

16. The lighting apparatus according to claim 10, wherein at least one of the first frustoconical surface, the second frustoconical surface and the third frustoconical surface is diffusive.

17. The lighting apparatus according to claim 10, wherein at least one of the first frustoconical surface, the second frustoconical surface and the third frustoconical surface is specular.

18. The lighting apparatus according to claim 10, wherein the first frustoconical surface is diffusive and the second frustoconical surface is specular.

19. The lighting apparatus according to claim 10, comprising a scattering sheet disposed over the aperture.

20. The lighting apparatus according to claim 10, comprising a plurality of nozzles for directing a flow of air across the heat sink, and a synthetic jet actuator for producing the flow of air through the nozzles.

21. The lighting apparatus according to claim 20, comprising a first and second plurality of nozzles, and wherein the synthetic jet actuator cyclically ingests and expels air through the first and second nozzles.

* * * * *